United States Patent
Doucet et al.

(10) Patent No.: US 6,570,692 B2
(45) Date of Patent: *May 27, 2003

(54) COMMUNICATION NETWORK BASED ON THE ATMOSPHERIC TRANSMISSION OF LIGHT

(75) Inventors: Mark A. Doucet, Bryan, TX (US); David L. Panak, Bryon, TX (US)

(73) Assignee: Dominion Lasercom, Inc., Bryan, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/055,588

(22) Filed: Jan. 22, 2002

(65) Prior Publication Data

US 2002/0114045 A1 Aug. 22, 2002

Related U.S. Application Data

(63) Continuation of application No. 09/106,826, filed on Jun. 29, 1998, now Pat. No. 6,348,986, which is a continuation-in-part of application No. 08/625,725, filed on Mar. 29, 1996, now Pat. No. 5,786,923.

(51) Int. Cl.[7] .............................................. H04B 10/00

(52) U.S. Cl. ........................ 359/172; 359/152; 359/159; 359/118; 359/128; 359/167; 359/176; 379/56.3

(58) Field of Search ................................ 359/172, 152, 359/159, 118, 128, 125, 139, 167, 176, 178; 379/56.3

(56) References Cited

U.S. PATENT DOCUMENTS

| | | | |
|---|---|---|---|
| 3,492,484 A | 1/1970 | Ito | 359/117 |
| 3,824,597 A | 7/1974 | Berg | 370/215 |
| 4,090,164 A | 5/1978 | Bell, III et al. | 359/164 |
| 4,358,858 A | 11/1982 | Tamura et al. | 359/152 |
| 4,533,247 A | 8/1985 | Epworth | 356/479 |
| 4,627,106 A | 12/1986 | Drake | 359/159 |
| 4,662,004 A | 4/1987 | Fredriksen et al. | 359/161 |
| 4,727,600 A | 2/1988 | Avakian | 359/172 |
| 4,796,301 A | 1/1989 | Uzawa et al. | 359/172 |
| 4,823,402 A | 4/1989 | Brooks | 359/159 |
| 4,847,481 A | 7/1989 | Altmann | 250/206.1 |

(List continued on next page.)

FOREIGN PATENT DOCUMENTS

| | | |
|---|---|---|
| EP | 0631401 A1 | 6/1994 |
| EP | 0653852 A1 | 11/1994 |
| JP | 1018326 | 1/1989 |

OTHER PUBLICATIONS

US 5,198,918, 3/1993, Freitas et al. (withdrawn)
European Search Report, Application No. 02004370.9–2411, dated Apr. 24, 2002.
Order filed in U.S. District Court, Western District of Washington at Seattle, Case No. C00–1062C, Terabeam v. Dominion on Sep. 25, 2001.
Marketing Brochure entitled "Atmospheric Infrared Transmission for Data/Voice", American Laser Systems, Inc., 2 pp.

(List continued on next page.)

*Primary Examiner*—Kinfe-Michael Negash
(74) *Attorney, Agent, or Firm*—Meyertons Hood Kivlin Kowert & Goetzel, P.C.; Jeffrey C. Hood

(57) ABSTRACT

A point-to-multipoint bi-directional wide area telecommunications network employing atmospheric optical communication. The network comprises a primary transceiver unit, a plurality of subscriber transceiver units and an optical router. The primary transceiver unit may send data destined for the subscriber transceiver units through the optical router, and the subscriber transceiver units may send data destined for the primary transceiver unit through the optical router. The primary transceiver unit and optical router communicate by means of light beams which are transmitted through the atmosphere. Similarly, the optical router and the subscriber transceiver units communicate by means of light beams which are transmitted through the atmosphere.

106 Claims, 10 Drawing Sheets

U.S. PATENT DOCUMENTS

| | | | |
|---|---|---|---|
| 4,888,816 A | 12/1989 | Sica, Jr. | 359/152 |
| 4,975,926 A | 12/1990 | Knapp | 375/141 |
| 4,977,618 A | 12/1990 | Allen | 359/159 |
| 4,982,445 A | 1/1991 | Grant et al. | 359/159 |
| 4,987,607 A | 1/1991 | Gilbreath et al. | 359/161 |
| 5,060,304 A | 10/1991 | Solinsky | 359/152 |
| 5,068,916 A | 11/1991 | Harrison et al. | 455/39 |
| 5,087,982 A | 2/1992 | Smothers | 359/137 |
| 5,090,795 A | 2/1992 | O'Meara et al. | 359/240 |
| 5,099,346 A | 3/1992 | Lee et al. | 359/118 |
| 5,121,243 A | 6/1992 | Miyahira et al. | 359/158 |
| 5,191,461 A | 3/1993 | Cranshaw et al. | 359/154 |
| 5,218,467 A | 6/1993 | Ross et al. | 359/172 |
| 5,229,593 A | 7/1993 | Cato | 359/118 |
| 5,247,380 A | 9/1993 | Lee et al. | 359/152 |
| 5,247,381 A | 9/1993 | Olmstead et al. | 359/118 |
| 5,282,073 A | 1/1994 | Defour et al. | 359/159 |
| 5,321,849 A | 1/1994 | Lemson | 455/67.1 |
| 5,297,144 A | 3/1994 | Gilbert et al. | 370/346 |
| 5,321,542 A | 6/1994 | Freitas et al. | 359/172 |
| 5,343,287 A | 8/1994 | Wilkins | 356/141.3 |
| 5,359,189 A | 10/1994 | Savicki | 250/216 |
| 5,359,446 A | 10/1994 | Johnson et al. | 359/152 |
| 5,363,221 A | 11/1994 | Sutton et al. | 359/11 |
| 5,371,623 A | 12/1994 | Eastmond et al. | 359/167 |
| 5,390,040 A | 2/1995 | Mayeux | 359/152 |
| 5,455,672 A | 10/1995 | Lamonde et al. | 356/73.1 |
| 5,493,436 A | 2/1996 | Karasawa et al. | 359/145 |
| 5,545,955 A | 8/1996 | Wood | 359/224 |
| 5,737,690 A | 4/1998 | Gutman | 340/7.54 |
| 5,748,813 A | 5/1998 | Cassidy | 385/24 |
| 5,786,923 A * | 7/1998 | Doucet et al. | 359/172 |
| 6,239,888 B1 | 5/2001 | Willebrand | 359/118 |

OTHER PUBLICATIONS

"VIPSLAN–10", JVC Marketing Information, 6 pp.
"VIPSLAN–10 Streaks Off the Wire", LAN Magazine, Sep. 1995, 2 pp.
"Omnibeam 4000", The Solutions Group, Advanced Network Solutions, 1995, 2 pp.
United States Statutory Invention Registration for "Covert Beam Projector", Reg. No. H299, Miller, Jr., Jul. 7, 1987.
Lehmann, R., "Brueckenschlag," Nachrichten Elektronik UND Telematik, vol. 50, No. 3, Mar. 1, 1996, pp. 26–27.
International Search Report for PCT/US97/04935 dated Jul. 18, 1997.
Sladek, "Vier–Strahl–Technik Macht Uebertragung Sicherer," Nachrichten Elektronik und Telematik, vol. 50, No. 8, Aug. 1996, pp. 32–33.
Kube, "Renaissance Eines Alten Konzepts," Nachrichten Elektronik und Telematik, vol. 49, No. 5, May 1995, pp. 15, 16, and 18.
International Search Report, Application No. PCT/US99/14710, mailed Mar. 8, 2000.
International Search Report for PCT/US99/15973 dated Jul. 15, 1999.
Electronics Letters, vol. 26, No. 18 dated Aug. 30, 1990.
Bernard J. Klein and John J. Degnan Optical Antenna Gain—1: Transmitting Antennas, Applied Optics, vol. 13, No. 9, Sep. 1974.
John J. Degnan and Bernard J. Klein Optical Antenna Gain—2: Receiving antennas, Applied Optics, vol. 13, No. 10, Oct. 1974.
N. J. Frigo et al. "Demonstrationn of Performance–Tiered Modulators in a WDM PON with a Single Shared Source," Proc. 21st Eur. Conf. On Opt. Comm (ECOC'95—Brussels) pp. 441–444.

* cited by examiner

COMMUNICATION NETWORK BASED ON THE ATMOSPHERIC TRANSMISSION OF LIGHT

CONTINUATION DATA

This application is a continuation of U.S. patent application Ser. No. 09/106,826 now U.S. Pat. No. 6,348,986 filed on Jun. 29, 1998 entitled "Wireless Fiber-Coupled Telecommunication Systems Based on Atmospheric Transmission of Laser Signals" which is a continuation-in-part of U.S. patent application Ser. No. 08/625,725 filed on Mar. 29, 1996 entitled "Point-to-Multipoint Wide Area Telecommunications Network via Atmospheric Laser Transmission Through a Remote Optical Router" which has issued as U.S. Pat. No. 5,786,923.

FIELD OF THE INVENTION

The present invention relates generally to wireless telecommunications networks, and more particularly to a broadband telecommunication system and network which employs atmospheric (i.e. free-space) laser transmission.

DESCRIPTION OF THE RELATED ART

Broadband communications applications such as interactive television, video telephony, video conferencing, video messaging, video on demand, high definition television (HDTV) and high-speed data services require a broadband communications network between and to the various subscribers. The current telecommunications network, referred to as the Public Switched Telephone Network (PSTN) or the plain old telephone system (POTS), is presently the only wired network that is accessible to almost the entire population. This system, although ideally suited and designed for point-to-point transmission and any-to-any connectivity, has become nearly overloaded with the use of voice, fax and data communications.

The PSTN today primarily comprises digital switching systems, and transmission over the local loop is typically by either T1 feeder copper-based systems or fiber optic cable systems. However, the subscriber loop is still primarily copper unshielded twisted pair (UTP) wiring, which has a limited capacity. Therefore, the physical nature of the system is severely bandwidth limited, with data transmissions typically in the 9,600–28,800 bits per second range. Thus, high speed broadband applications cannot feasibly be based on POTS technology.

New hard-wired systems, such as ISDN (Integrated Services Digital Network) and fiber optic networks, offer high speed bi-directional communications available to many individuals. However, ISDN itself may not provide sufficient bandwidth for many broadband communications applications. In addition, ISDN requires that most subscribers be connected with upgraded copper wire. A fiber based network, such as fiber to the curb (FTTC) and fiber to the home (FTTH), requires that new fiber optic cable be run to every subscriber. The cost of implementing a fiber optic network across the United States would be very expensive. Other alternatives for increasing the capacity of existing networks include ADSL (Asymmetric Digital Subscriber Line), SDSL (Symmetric Digital Subscriber Line), and HFC (Hybrid Fiber Coax), among others.

An alternative to hard wired network solutions is a wireless-based solution. Most currently existing methods for wireless telecommunications are based upon broadcast methodology in the electromagnetic spectrum. One example of a wireless broadcast medium is the Direct Broadcast Satellite (DBS) system, such as "DirecTV". In general, broadcast systems are widespread and numerous. However, available bandwidth is increasingly limited by the sheer volume of subscribers, especially with the rapid growth in the cellular phone market. The result of this "crowding of the bands" is that the wireless electromagnetic systems are unable to meet the voracious need of the public for high speed data communications.

Another method for broadband point-to-point communications employs lasers in a point-to-point system that establishes a single continuous, high-speed, bi-directional, multi-channel, atmospheric connection. Laser based wireless systems have been developed for establishing point-to-point, bi-directional and high speed telecommunications through the atmosphere. The range for such systems is typically 0.5 to 1.2 miles, with some having a range of 4 miles or more. The longest atmospheric communications path achieved with a point-to-point system exceeded 100 miles. These single path systems require a laser and transceiver optics at each end of the connection. The connections are capable of maintaining high speed bi-directional communications in some of the most severe inclement weather conditions. The cost of such systems are typically in the $10,000 to $20,000 dollar range however, making them unsuitable for most home and business use.

Therefore, a wireless, laser based telecommunications system is desired that enables a number of subscribers to share a communications path to a great number of subscribers. A wireless, laser based telecommunications system is further desired which reduces the cost to each subscriber, yet still provides high speed, bi-directional, broadband, wide area telecommunications. A system is desired which does not require huge installation costs of ISDN and fiber optics, and which does not require any of the electromagnetic broadcast bands of the mobile communication systems. Such a network could be employed in a wide variety of applications such as telephony, data communications such as the Internet, teleconferencing, radio broadcast, and various television applications such as cable television, HDTV and interactive TV.

SUMMARY OF THE INVENTION

The present invention comprises a point-to-multipoint bi-directional wide area telecommunications network employing atmospheric optical communication. The network comprises a primary transceiver unit, an optical router, and a plurality of subscriber transceiver units. The primary transceiver unit generates a first light beam which includes first modulated data. The optical router receives the first light beam and demodulates the first data. The optical router modulates the first data onto a second light beam and transmits the second light beam to the subscriber transceiver units. The optical router demodulates, modulates and transmits to each of the subscriber transceiver units in a time-multiplexed fashion.

The subscriber transceiver units receive the second light beam and demodulate the first data. Each subscriber transceiver unit comprises an optical antenna or other optical receiver/transmitter. The optical antenna is preferably coupled to an input/output device such as a set-top box or display system, e.g., a computer or television, by a fiber optic cable.

In the other direction, the subscriber transceiver units atmospherically transmit a third light beam which includes second modulated data to the optical router. The optical router demodulates the second data, modulates the second data on a fourth light beam, and transmits the fourth light beam to the primary transceiver unit. The primary transceiver unit receives and demodulates the second data. The optical router demodulates, modulates and transmits to each of the subscriber transceiver units in a time-multiplexed fashion. Thereby, bi-directional communication channels between the primary transceiver unit and the plurality of subscriber transceiver units are established for transferring data in each direction.

The preferred embodiment of the optical router comprises a secondary transceiver unit, a plurality of transceiver modules and an electronic router for routing data between the secondary transceiver unit and the plurality of transceiver modules to establish the communication channels between the primary transceiver unit and the plurality of subscriber transceiver units. The secondary transceiver unit transceives light beams including data with the primary transceiver unit and the transceiver modules transceives light beams including data with the subscriber transceiver units. The transceiver modules comprise an X-Y beam deflector for deflecting the light beams to a portion of the subscriber transceiver units in a time-multiplexed fashion.

In an alternate embodiment of the optical router, the optical router simply redirects the light beams between the primary transceiver unit and the subscriber transceiver units in a time-multiplexed fashion rather than demodulating and re-modulating the data. The alternate optical router employs a mirror and lens set to redirect the light beams.

Therefore, the present invention comprises a laser-based atmospheric communication network which provides broadband bi-directional communications to a plurality of subscribers. The present invention provides a bi-directional broadband optical communication network with significantly reduced infrastructure costs. A network of such networks comprising multiple optical routers and multiple primary transceiver units is further contemplated by the present invention.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PRESENT INVENTION

Incorporation by Reference

U.S. patent application Ser. No. 09/106,826 filed on Jun. 29, 1998 entitled "Wireless Fiber-Coupled Telecommunication Systems Based on Atmospheric Transmission of Laser Signals" is hereby incorporated by reference in its entirety U.S. patent application Ser. No. 08/625,725 filed on Mar. 29, 1996 entitled "Point-to-Multipoint Wide Area Telecommunications Network via Atmospheric Laser Transmission Through a Remote Optical Router" which has issued as U.S. Pat. No. 5,786,923 is hereby incorporated by reference in its entirety.

For general information on broadband telecommunications and optical data communications, please see Lee, Kang and Lee, *Broadband Telecommunications Technology*, Artech House, 1993 which is hereby incorporated by reference in its entirety. Also please see Davis, Carome, Weik, Ezekiel, and Einzig, *Fiber Optic Sensor Technology Handbook*, Optical Technologies Incorporated, 1982, 1986, Herndon, Va., which is hereby incorporated by reference in its entirety.

A Network With an Optical Router and a Primary Transceiver

Figure 1:
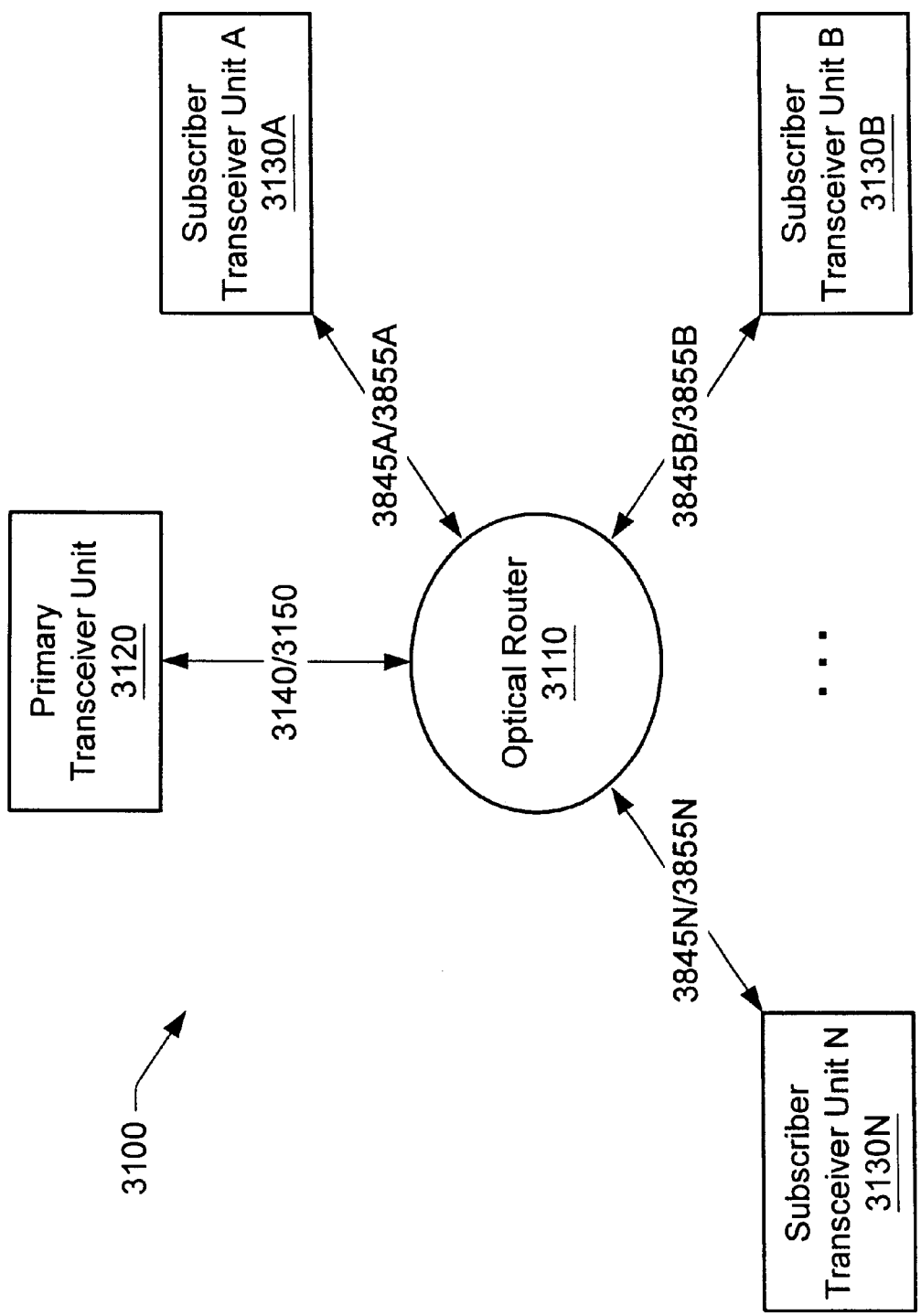
FIG. 1 illustrates a point-to-multipoint wide-area telecommunications network using atmospheric laser transmission according to the present invention.

Referring now to FIG. 1, a point-to-multipoint wide-area telecommunications network 3100 using atmospheric light beam or laser transmission according to the present invention is shown. The network 3100 preferably comprises a primary transceiver unit 3120, an optical router 3110 and a plurality of subscriber transceiver units 3130A–3130N (referred to collectively as 3130). In an alternate embodiment, the network 3100 comprises only the optical router 3110 and the plurality of subscriber transceiver units. The present invention provides a broadband bi-directional communication network with reduced infrastructure costs, i.e., no cable or fiber is required to be laid in the subscriber loop, i.e., to the subscribers.

According to the preferred embodiment of network 3100, the subscriber transceiver units are located at subscriber premises, such as homes or businesses. The optical router 3110 is located in the vicinity of the subscriber transceiver units 3130, and the optical router optically communicates with the subscriber units 3130. The optical router 3110 has an associated range of accessibility, wherein the optical router 3110 is capable of communicating with subscriber transceiver units located within a circular area around the optical router 3110. In the preferred embodiment of optical router 3110, the range of accessibility is approximately between 2000 and 4000 feet. It is contemplated, however, that optical router 3110 may be configured with larger or smaller ranges of accessibility. Each of the subscriber transceiver units 3130 is positioned in a line of sight path relative to the optical router 3110.

The optical router 3110 is positioned in a line of sight path relative to the primary transceiver unit 3120. The optical router 3110 is preferably mounted on, for example, a pole, building, or other structure approximately 75 feet above ground level. Preferably the distance between the primary transceiver unit 3120 and the optical router 3110 is approximately in the range from one half to ten miles. It is contemplated, however, that larger or smaller distances may exist between the optical router 3110 and the primary transceiver unit 3120 of network 3100

The primary transceiver unit 3120 generates a first light beam 3140 and atmospherically transmits the first light beam 3140 to the optical router 3110. In the preferred embodiment, the term "light beam" is intended to encompass any of various types of light transmission, including lasers, a super-fluorescent light source, or other coherent and/or non-coherent light or optical transmission.

The primary transceiver unit 3120 modulates data on the first light beam 3140 before transmitting the first light beam 3140 to the optical router 3110. Data may be modulated on the first light beam using any of various techniques, including amplitude and/or frequency modulation techniques, as is well known in the art.

The optical router 3110 atmospherically receives the first light beam 3140 including the data sent by the primary transceiver unit 3120 and demodulates the data, then modulates the data on and atmospherically transmits a second light beam 3845A–3845N (referred to collectively as 3845) to the subscriber transceiver units 3130. The second light beam 3845 contains at least a portion of the data sent by the primary transceiver unit 120. The subscriber transceiver units 3130 atmospherically receive the second light beam 3845 and demodulate the data sent by the primary transceiver unit 3120 from the second light beam 3845. The present invention distinguishes among different users, i.e., shares the communication bandwidth, using techniques such as time-division multiple access (TDMA) or frequency-division multiple access (FDMA). The present invention may also use code-division multiple access (CDMA) techniques.

The subscriber transceiver units 3130 atmospherically transmit a third light beam 3855A–3855N (referred to collectively as 3855) to the optical router 3110. The subscriber transceiver units 3130 modulate data on the third light beam 3855 and then transmit the third light beam 3855 to the optical router 3110. The optical router 3110 atmospherically receives the third light beam 3855 including the data sent by the subscriber transceiver units 3130 and demodulates the data, then modulates the data on and atmospherically transmits a fourth light beam 3150 to the primary transceiver unit 3120. The primary transceiver unit 3120 receives the fourth light beam 3150 and demodulates the data sent by the subscriber transceiver units 3130 from the fourth light beam 3150.

The optical router 3110 routes data between the primary transceiver unit 3120 and each of the subscriber transceiver units 3130 thus establishing channels of communication, that is, subscriber channels, on the light beams between the primary transceiver unit 3120 and the subscriber transceiver units 3130. Preferably the optical router 3110 establishes subscriber channels in a time-multiplexed fashion. During a first time-period the optical router 3110 establishes a first set of one or more subscriber channels between the primary transceiver unit 3120 and a first set of one or more subscriber transceiver units 3130. Next, the optical router 3110 establishes a second set of subscriber channels between the primary transceiver unit 3120 and a second set of subscriber transceiver units 3130 during a second time-period. The optical router 3110 proceeds in this manner, establishing a two-way or bi-directional subscriber channel with each of the subscriber transceiver units 3130 in the range of accessibility of the optical router 3110.

One embodiment of network 3100 contemplates any or all of the first light beam 3140, second light beam 3845, third light beam 3855, and fourth light beam 3150, comprising a plurality of different wavelengths, wherein data is modulated on each wavelength of the light beams, thereby advantageously increasing the bandwidth of the subscriber channels.

The network of the present invention may support a large number of subscribers. One embodiment contemplates on the order of 1000 subscriber transceiver units supported by a single optical router.

In an alternative embodiment of network 3100, primary transceiver unit 3120 receives the first light beam 3140 from another transceiver (not shown) and optically redirects the first light beam 3140 to optical router 3110. Conversely, primary transceiver 3120 optically redirects the fourth light beam 3150 from optical router 3110 to the other transceiver.

In a second alternative embodiment of network 3100, primary transceiver unit 3120 receives a source light beam from another transceiver (not shown), and demodulates data from the source light beam which then becomes the data source for modulating the first light beam. Conversely, primary transceiver unit 3120 demodulates data sent by the subscriber transceiver units from the fourth light beam 3150. The demodulated data is modulated onto a return light beam which is atmospherically transmitted to the other transceiver.

In a third alternative embodiment of network 3100, optical router 3110 communicates with another transceiver (not shown). Optical router 3110 atmospherically transmits the fourth light beam 3150 to the other transceiver for demodulation, and receives the first light beam 3140 from the other transceiver.

Thus, it may be readily observed that the elements recited above form a wireless point-to-multipoint wide-area telecommunications network. By establishing subscriber communications channels in a multiplexed manner using atmospherically transmitted light beams, the present invention advantageously provides a telecommunications network which has the potential to be much less expensive than current wired networks which rely on copper wire and/or optical fiber.

Additionally, the present invention advantageously provides a much less expensive telecommunications network than a network which employs an array of point-to-point atmospherically transmitted light beams.

Further, by employing light beams as the communications path, the present invention advantageously avoids the costs associated with licensing and purchasing bands in the radio spectrum.

Finally, the present invention advantageously provides a communications network which consumes much less power than a system which employs an angularly dispersed light beam.

In the preferred embodiment of network 3100, the primary transceiver unit 3120 communicates control information to the optical router 3110 and subscriber transceiver units 3130. The control information for the optical router 3110 contains information about the angular location of the subscriber transceiver units 3130. The control information also contains timing information to instruct the optical router 3110 regarding multiplexing of the light beams and thus establishing the subscriber communications channels. The control information for the subscriber transceiver units 3130 contains timing information instructing the subscriber transceiver units 3130 about when to transmit the third light beam 3855 to the optical router 3110. The primary transceiver unit 3120 transmits the first light beam 3140 and receives the fourth light beam 3150 cooperatively according to the control information which the primary transceiver unit 3120 communicates to the optical router 3110 and subscriber transceiver units 3130.

In the preferred embodiment of network 3100, the primary transceiver unit 3120 includes a master clock and computes timing control information based upon at least a plurality of the following factors: the data packet size, the local speed of light, the number of subscribers, the distance between the primary transceiver unit and the optical router, the distance between the optical router and the respective subscriber transceiver unit, the processing time of the subscriber transceiver units, the time associated with the electronic router (discussed below), and the switching speed of the X-Y beam deflectors (discussed below).

In the preferred embodiment of network 3100, the first light beam 3140 and the fourth light beam 3150 are substantially collinear as are the second light beam 3845 and third light beam 3855. The collinear light beam embodiment advantageously allows many of the optical components of the primary transceiver unit, optical router and subscriber transceiver units to be shared by the light beams. In this embodiment, the first light beam 3140 and the fourth light beam 3150 have different frequencies or polarities as do the second light beam 3845 and third light beam 3855 to advantageously avoid cross-talk between the two light beams. In an alternate embodiment, the first light beam 3140 and fourth light beam 3150 are in close proximity but not collinear as are the second light beam 3845 and third light beam 3855.

Figure 2:
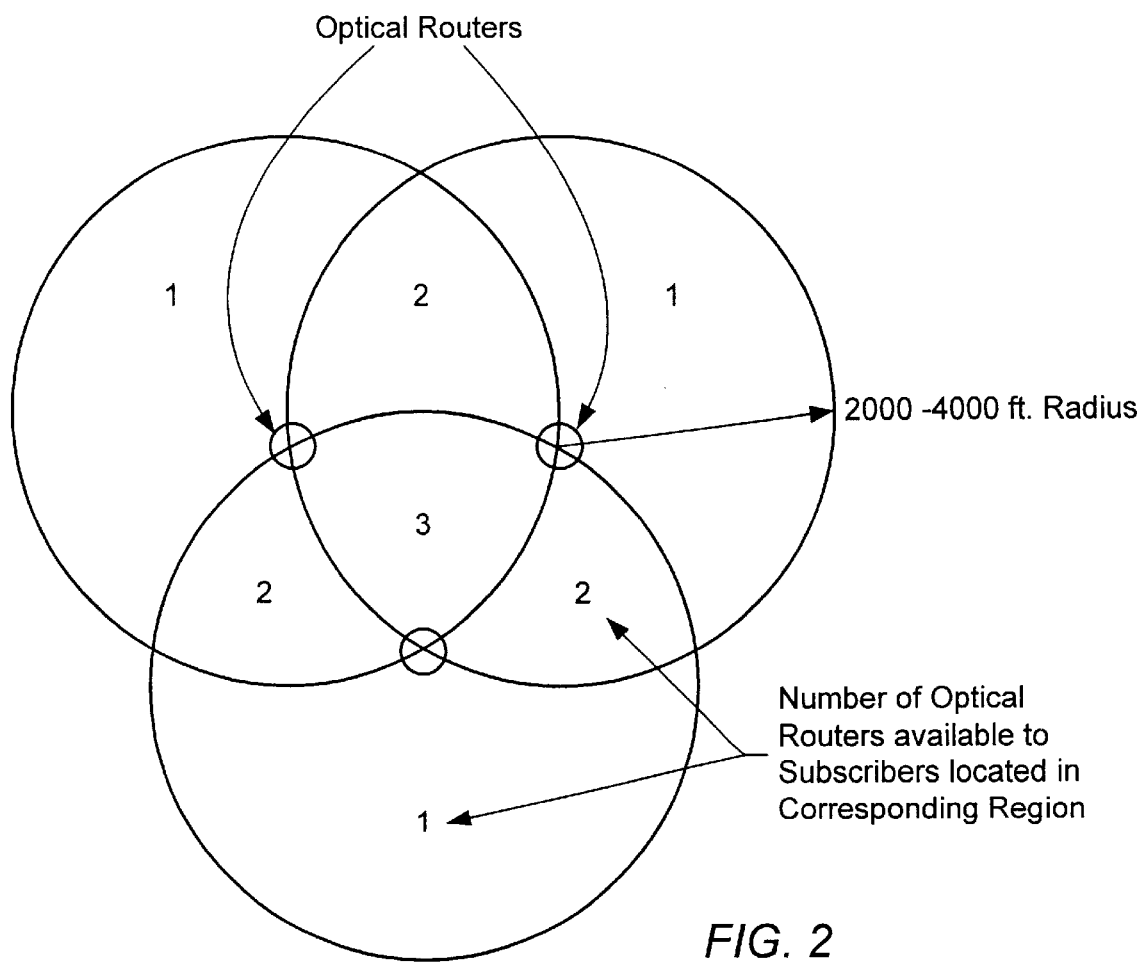
FIG. 2 illustrates the overlapping coverage achieved by the incorporation of multiple optical routers in the network of FIG. 1.

Referring now to FIG. 2, a network comprising a plurality of optical routers is shown. Each optical router has an associated range of accessibility. In one embodiment of the present invention, the optical routers are spatially located such that the accessibility ranges of some of the optical routers overlap. That is, more than one optical router is able to service a given subscriber. FIG. 2 shows various regions of coverage and indicates the number of optical routers which may service a subscriber located in the region.

In one embodiment of network 3100, if a subscriber transceiver unit detects a loss of reception of the first light beam, the subscriber transceiver unit searches for another optical router by which to receive service. By providing overlapping coverage of a given subscriber by multiple optical routers, the present invention advantageously provides an element of redundancy and hence more reliable operation.

In FIG. 2, three optical routers are shown. However, the present invention is not limited in the number of optical routers which may be serviced by a given primary transceiver unit 3120, nor the number of optical routers which may service a given subscriber transceiver unit 3130.

In one embodiment of network 3100, the primary transceiver unit 3120 comprises a plurality of light sources to generate a plurality of first light beams to transmit to a plurality of optical routers. In another embodiment of network 3100, the primary transceiver unit 3120 comprises a single light source to generate a single light beam, and the primary transceiver unit 3120 is configured to split the light beam generated by the single light source into multiple first light beams which are transmitted to a plurality of optical routers. In both embodiments the primary transceiver unit 3120 modulates subscriber data on each first light beams.

Alternate Embodiments

Figure 3:
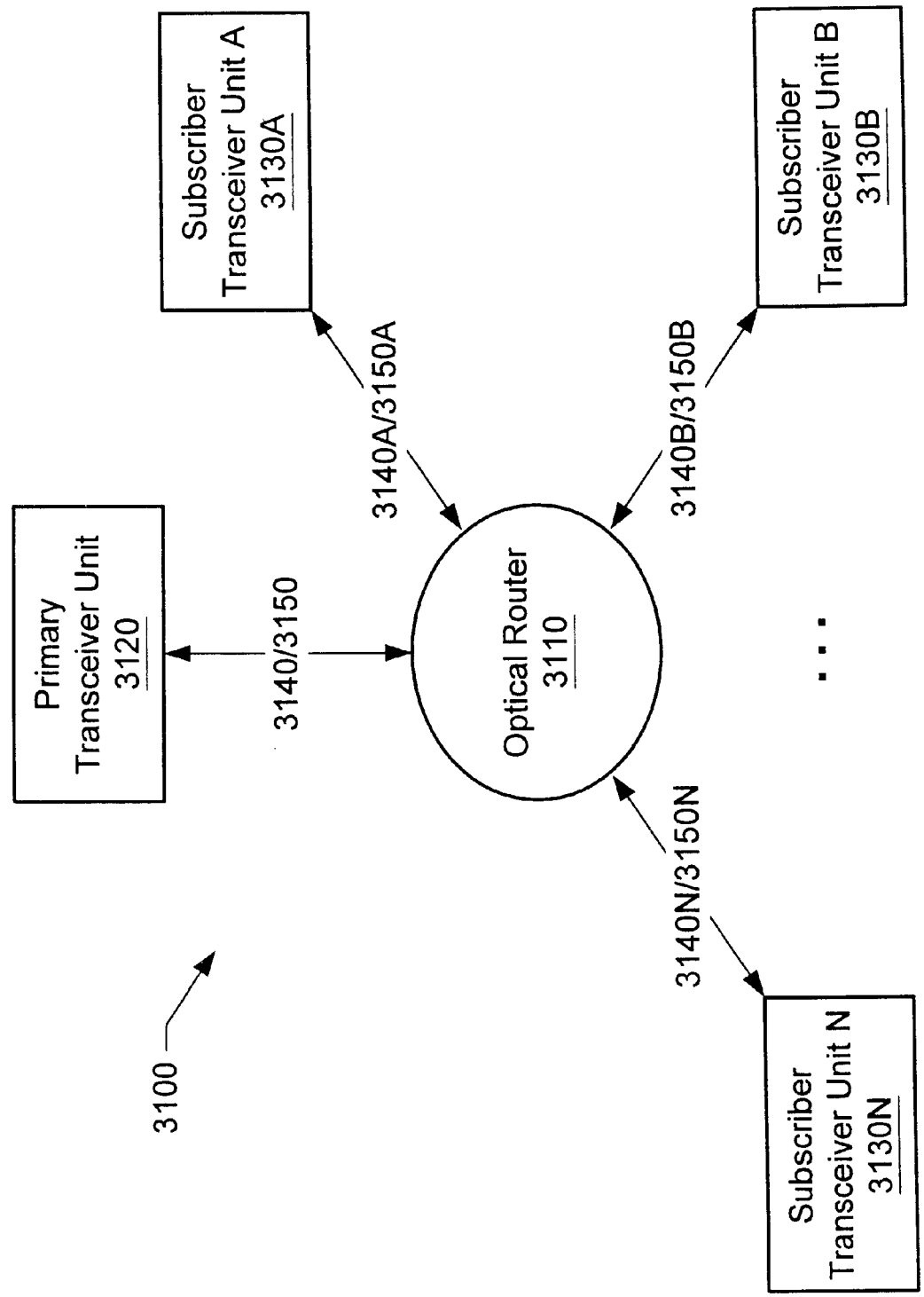
FIG. 3 illustrates a point-to-multipoint wide area telecommunications network using atmospheric laser transmission according to an alternate embodiment of the present invention.

Referring now to FIG. 3, an alternate embodiment of the network 3100 of FIG. 1 is shown. The embodiment of FIG. 3 is similar to the embodiment of FIG. 1, and corresponding elements are numbered identically for simplicity and clarity. The optical router 3110 of FIG. 3 corresponds to the alternate embodiment of the optical router 3110 shown in FIG. 7 and described below. In the alternate embodiment the optical router 3110 redirects the light beam from the primary transceiver unit 3120 to the subscriber transceiver units 3130 and redirects the light beams from the subscriber transceiver units 3130 to the primary transceiver unit 3120 rather than demodulating the data and re-modulating it. The optical router 3110 receives the first light beam 3140 and redirects the first light beam 3140 to the subscriber transceiver units 3130. The subscriber transceiver units 3130 receive the first light beam 3140 and demodulate the data sent by the primary transceiver unit 3120 from the first light beam 3140. The present embodiment distinguishes among different users, i.e., shares the communication bandwidth, using techniques such as time division multiple access (TDMA) or frequency division multiple access (FDMA). The present embodiment may also use code division multiple access (CDMA) techniques.

The subscriber transceiver units 3130 atmospherically transmit a second light beam 3150A–3150N (referred to collectively as 3150) to the optical router 3110. The subscriber transceiver units 3130 modulate data on the second light beam 3150 and then transmit the second light beam 3150 to the optical router 3110. The optical router 3110 receives the second light beam 3150 and redirects the second light beam 3150 to the primary transceiver unit 3120. The primary transceiver unit 3120 receives the second light beam 3150 and demodulates the data sent by the subscriber transceiver units 3130 from the second light beam 3150. Alternatively, the optical router 3110 and/or the primary transceiver unit 3120 provide the second light beam 3150 to another transceiver (not shown) for demodulation, wherein this other transceiver is in communication with the primary transceiver unit 3120.

The optical router 3110 redirects the first and second light beams between the primary transceiver unit 3120 and each of the subscriber transceiver units 3130 during different time periods, that is, in a time-multiplexed manner. In other words, the optical router 3110 establishes channels of communication comprising the light beams between the primary transceiver unit 3120 and the subscriber transceiver units 3130 in distinct time slices. Thus, during a first time period the optical router 3110 establishes a first subscriber channel by redirecting the first light beam 3140 from the primary transceiver unit 3120 to a first subscriber transceiver unit 3130 and redirecting the second light beam 3150 from the first subscriber transceiver unit 3130 to the primary transceiver unit 3120. Next, the optical router 3110 establishes a second subscriber channel between the primary transceiver unit 3120 and a second subscriber transceiver unit 3130 during a second time period. The optical router 3110 proceeds in this manner, establishing a two-way or bi-directional subscriber channel with each of the subscriber transceiver units 3130 in the range of accessibility of the optical router 3110.

An alternate embodiment of the network 3100 contemplates an alternate multiplexing scheme wherein the primary transceiver unit 3120 is configured to generate and/or transmit a first light beam 3140 which comprises a plurality of different wavelengths which correspond to the subscribers. The optical router 3110 receives the first light beam and provides each of the wavelength portions to the respective subscriber transceiver units. In this embodiment, the optical router 3110 includes a grating, such as a diffraction grating, which separates the different frequency or spectra and provides the different wavelength portions to the respective subscribers. Additionally, each subscriber transceiver unit is configured to generate a second light beam of one or more respective unique wavelengths. The optical router 3110 redirects the respective wavelength light beams of the first and second light beams between the primary transceiver unit 3120 and respective subscriber transceiver units 3130, that is, in a frequency-multiplexed manner. Alternately stated, the optical router 3110 establishes subscriber channels of communication on the light beams between the primary transceiver unit 3120 and the subscriber transceiver units 3130 based upon different wavelength portions of a light beam. Thus, the optical router 3110 establishes a first subscriber channel by redirecting a first wavelength portion of the first light beam from the primary transceiver unit 3120 to a first subscriber transceiver unit 3130 and redirecting the second light beam 3150 comprising the first wavelength from the first subscriber transceiver unit 3130 to the primary transceiver unit 3120. Simultaneously, the optical router 3110 establishes a second subscriber channel between the primary transceiver unit 3120 and a second subscriber transceiver unit 3130 using a second wavelength portion of the first light beam 3140 and a second light beam 3150 comprising the second wavelength. The optical router 3110 operates in this manner, establishing a subscriber channel with subscriber transceiver units 3130 in the range of accessibility of the optical router 3110. By employing multiple wavelength light beams and FDMA techniques, the invention advantageously increases the bandwidth available to the subscribers.

Another alternate multiplexing embodiment is contemplated in which the optical router 3110 establishes subscriber communication channels in a combined time-multiplexed and frequency-multiplexed manner. A subscriber requiring increased data bandwidth employs a subscriber transceiver unit configured to receive multiple light beams of differing wavelengths and/or multiple time-slots, thereby multiplying the bandwidth available to the subscriber. In another embodiment, the present invention employs code division multiple access (CDMA) techniques using bipolar codes.

The present invention contemplates an alternate embodiment of the network 3100 comprising unidirectional data transmission, that is, broadcast or point-to-multipoint data communication only from the primary transceiver unit 3120 and/or optical router 3110 to the subscriber transceiver units 3130. In this embodiment, the subscriber transceiver units 3130 do not generate light beams back through the optical router 3110 to the primary transceiver unit 3120. Other aspects of this alternate embodiment are as described above in the preferred embodiment of FIG. 1 and the alternate embodiment of FIG. 3. This alternate embodiment is contemplated as an advantageous alternative to current implementations of broadcast television, particularly high definition television, or cable television, for example. Thus this embodiment may comprise a pure broadcast (one-way) network. Alternatively, the network 3100 may use a different return path from the subscriber units 3130 to the primary transceiver unit 3120, such as an analog modem (POTS) or ISDN.

The present invention further contemplates an alternate embodiment of the network 3100 in which the primary transceiver unit 3120 essentially resides in the same location as the optical router 3110. Alternately stated, the primary transceiver unit 3120 and the optical router 3110 are essentially combined into a single unit. In this embodiment, the light source of the primary transceiver unit 3120 transmits only a few inches or feet into the optical router 3110. Various elements of the primary transceiver unit 3120 and optical router 3110 may be eliminated or combined in such an embodiment. In this embodiment, fiber optic cable may be used to transfer the light beam directly to the optical router 3110, and thus a separate primary transceiver unit 3120 is not needed.

The Optical Router

Figure 4:
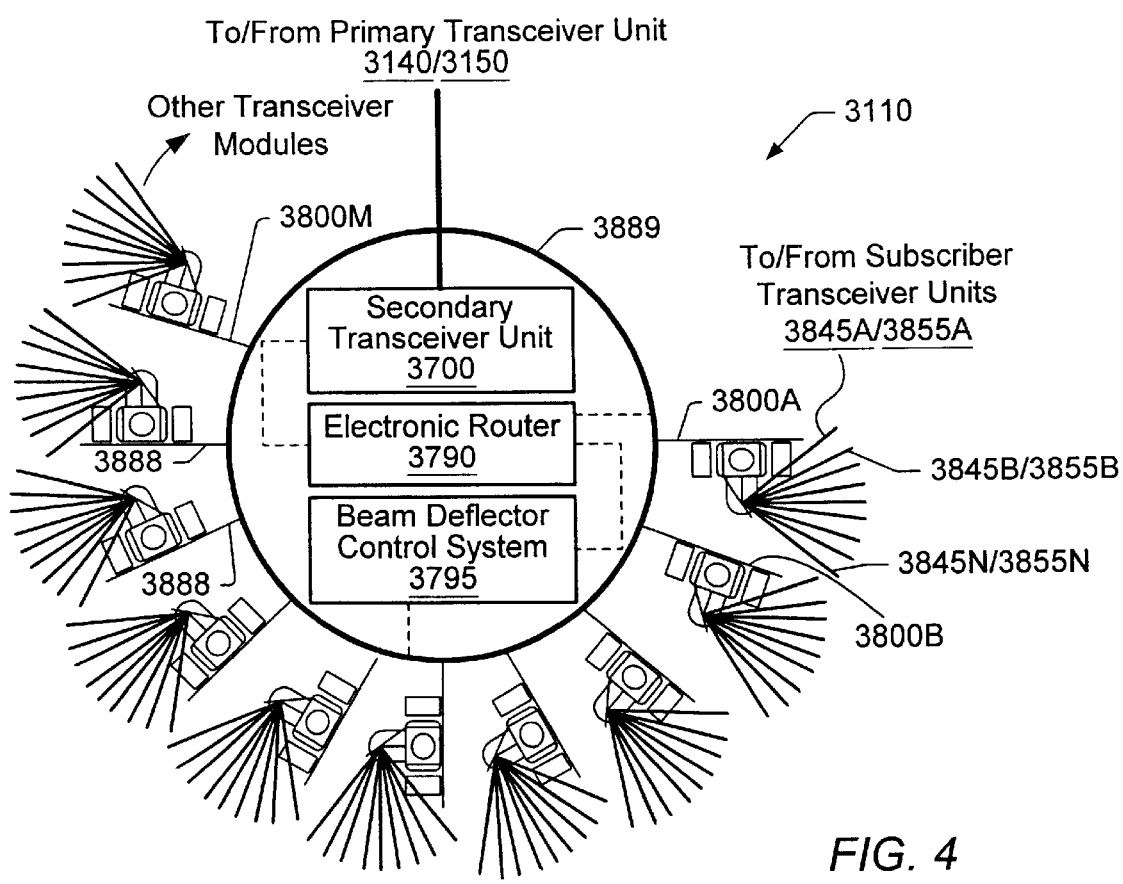
FIG. 4 illustrates the preferred embodiment of the optical router in the network of FIG. 1.

Referring now to FIG. 4, the preferred embodiment of the optical router 3110 in the network 3100 (of FIG. 1) is shown. The optical router 3110 comprises a secondary transceiver unit 3700 coupled to a plurality of transceiver modules 3800A–3800M (referred to collectively as 3800) by an electronic router 3790. The transceiver modules 3800 are coupled to a circular backplane 3889. The electronic router 3790 is coupled to the transceiver modules 3800 through the backplane 3889.

Transceiver module 3800A (representative of the transceiver modules 3800) has a backplane connector 3888 which connects the transceiver module 3800A to the backplane. The transceiver module 3800A is configured to transmit the second light beam 3845 to and receive the third light beam 3855 from a portion of the subscriber transceiver units 3130, namely those subscriber transceiver units 3130 within a portion of the circular area around the optical router 3110. The transceiver modules 3800 collectively provide the optical router 3110 with a 360 degree range of accessibility to the subscriber transceiver units 3130.

A beam deflector control system 3795 is coupled through the backplane 3889 to the transceiver modules 3800 for controlling the deflection of the second light beam 3845 and third light beam 3855 by the transceiver modules 3800. The beam deflector control system 3795 is also coupled to the electronic router 3790 and receives beam deflector control information from the primary transceiver unit 3120 through the electronic router 3790.

The electronic router 3790 receives routing control information from the primary transceiver unit 3120. The routing control information regards the routing of data sent by the primary transceiver unit 3120 from the secondary transceiver unit 3700 to the various transceiver modules 3800 for atmospheric transmission to the subscriber transceiver units 3130. Conversely, the routing control information regards the routing of data sent by the subscriber transceiver units 3130 from the various transceiver modules 3800 to the secondary transceiver unit 700 for atmospheric transmission to the primary transceiver unit 3120.

The secondary transceiver unit 3700 atmospherically receives the first light beam 3140 including the data sent by the primary transceiver unit 3120 and demodulates the data. The secondary transceiver unit 3700 communicates the data sent by the primary transceiver unit 3120 to the electronic router 3790. The electronic router 3790 routes the data from the secondary transceiver unit 3700 to the appropriate one of the transceiver modules 3800. For illustration purposes let us assume transceiver module 3800A is the appropriate transceiver module 3800. The transceiver module 3800A receives the data and modulates the data onto the second light beam 3845 which is atmospherically transmitted to the appropriate subscriber transceiver unit 3130A.

Conversely, the transceiver module 3800A receives the third light beam 3855 including data from the subscriber transceiver unit 3130 and demodulates the data. The transceiver module 3800A communicates the data sent by the subscriber transceiver unit 3130A to the electronic router 3790. The electronic router 3790 routes the data from the transceiver module 3800A to the secondary transceiver unit 3700. The secondary transceiver unit 700 modulates the data sent by the subscriber transceiver unit 3130A onto the fourth light beam 3150 and atmospherically transmits the fourth light beam 3150 including the data sent by the subscriber transceiver unit 3130A to the primary transceiver unit 3120.

FIG. 5

Figure 5:
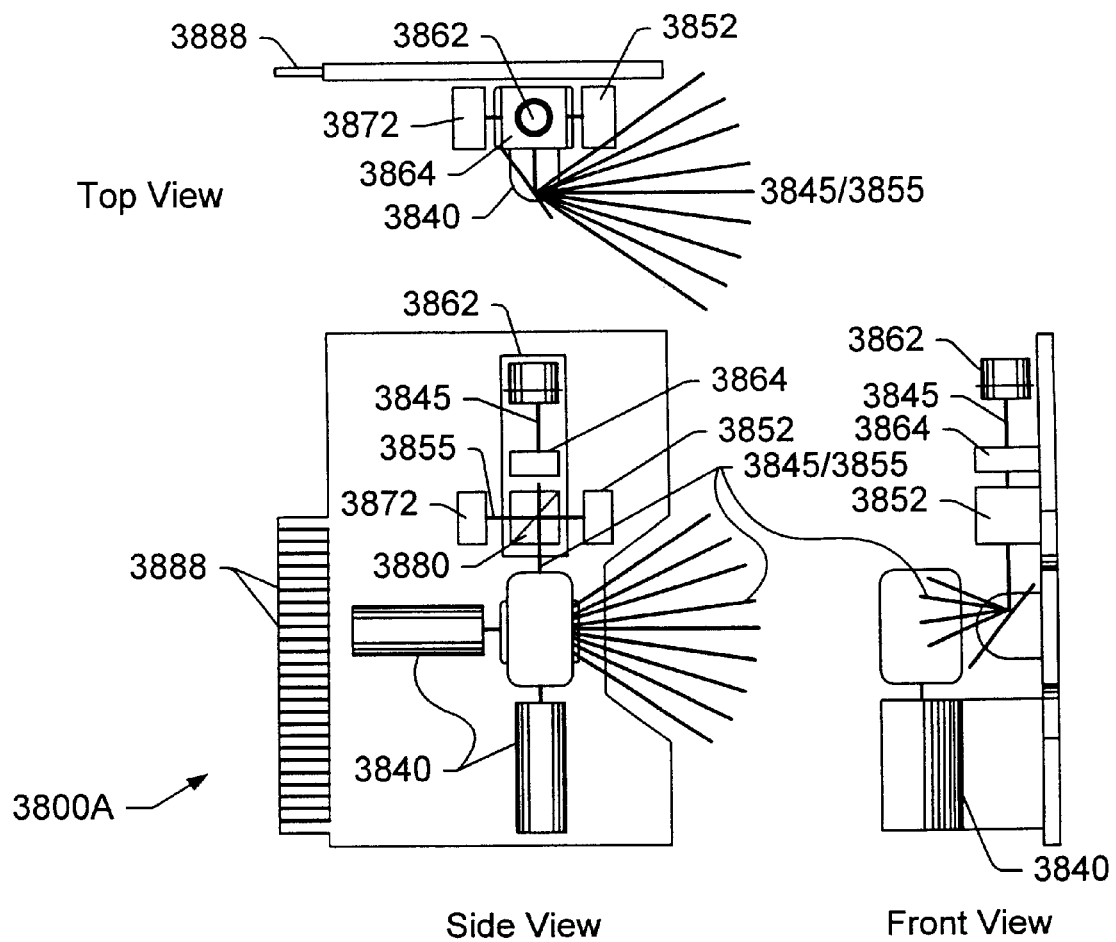
FIG. 5 is a plan view of one of the transceiver modules of FIG. 4.

Referring now to FIG. 5, a plan view of the transceiver module 3800A of the optical router 3110 of FIG. 4 is shown.

The transceiver module 3800A comprises a light source 3862 configured to generate the second light beam 3845. A beam modulator 3864 receives data which was sent by the primary transceiver unit 3120 from the electronic router 3790 through the backplane connector 3888 and modulates the data onto the second light beam 3845. The second light beam 3845 is deflected by an X-Y beam deflector 3840 to the subscriber transceiver unit 3130A.

Preferably the X-Y beam deflector 3840 is a galvanometer mirror pair. Galvanometer mirrors are well known, particularly in the art of laser printer technology and the art of laser light shows. Alternatively the X-Y beam deflector 3840 is an acousto-optic or solid state beam deflector. The optical router 3110 light source 3862 preferably comprises one or more continuous wave or pulsed beam lasers as are well known in the art, such as gas, solid state or diode lasers. The beam modulator 3864 preferably comprises an electro-optic cell. Alternatively, the beam modulator 3864 is a bulk type modulator. The light source and beam modulator configuration is indicative of those well known in fiber optic communication link transmission systems. However, the laser power output is typically significantly greater than those used in fiber optic systems.

While the X-Y beam deflector 3840 deflects the second light beam 3845 to the subscriber transceiver unit 3130A the X-Y beam deflector 3840 simultaneously deflects the third light beam 3855 from the subscriber transceiver unit 3130A to a beam splitter 3880. The beam splitter 3880 splits a relatively large portion of the third light beam 3855 to a beam demodulator 3872 which receives the third light beam 3855 and demodulates data sent by the subscriber transceiver unit 3130A from the third light beam 3855. The beam demodulator 3872 communicates the data through the backplane connector 3888 to the electronic router 3790. The beam demodulator 3872 preferably comprises a photo-diode as is common in the art.

During a first time period, the X-Y beam deflector 3840 deflects the second light beam 3845 from the light source 3862 to a first subscriber transceiver unit 3130A and deflects the third light beam 3855 from the first subscriber transceiver unit 3130A to the beam demodulator 3872. Hence, the transceiver module 3800A establishes a bi-directional communications channel using the second and third light beams between the transceiver module 3800A and the first subscriber transceiver unit 3130A for a first period of time. Hence, the bi-directional communications channel between the transceiver module 3800A and the first subscriber transceiver unit 3130A comprises a portion of the subscriber channel described above between the primary transceiver unit 3120 and the subscriber transceiver unit 3130A. During subsequent periods of time the X-Y beam deflector 3840 deflects the second and third light beams to and from other subscriber transceiver units 3130 in a time-multiplexed manner.

Each of the transceiver modules 3800 establishes bi-directional communication channels as just described between the given transceiver module and the portion of the subscriber transceiver units 3130 accessible by the given transceiver module in a time-multiplexed fashion and simultaneously with the other transceiver modules. In this manner, a portion of a wireless point-to-multipoint bi-directional wide area telecommunications network is advantageously formed between the optical router 3110 and the subscriber transceiver units 3130.

The beam splitter 3880 splits a relatively small portion of the third light beam 3855 to a beam alignment detector 3852 which receives the split portion of the third light beam 3855 and detects misalignment or wander of the third light beam 3855 from the subscriber transceiver unit 3130A which may occur and stores the beam stabilization information. The beam alignment detector 3852 communicates the beam stabilization information through the backplane 888 via the electronic router 3790 to the secondary transceiver unit 3700. The secondary transceiver unit 3700 transmits the beam stabilization information to the primary transceiver unit 3120. The primary transceiver unit 3120 communicates the beam stabilization information to the given subscriber transceiver unit so that the subscriber transceiver unit can adjust the beam for misalignment or wander appropriately. Atmospheric turbulence and density variations along the atmospheric path between the subscriber transceiver unit 3130A and the optical router 3110 may account for misalignment of the third light beam 3855 on the X-Y beam deflector 3840 of the transceiver module 3800A. Likewise, events such as ground shifting or tower sway may cause the positions of the subscriber transceiver unit 3130A or optical router 3110 relative to each other to change.

FIG. 6

Figure 6:
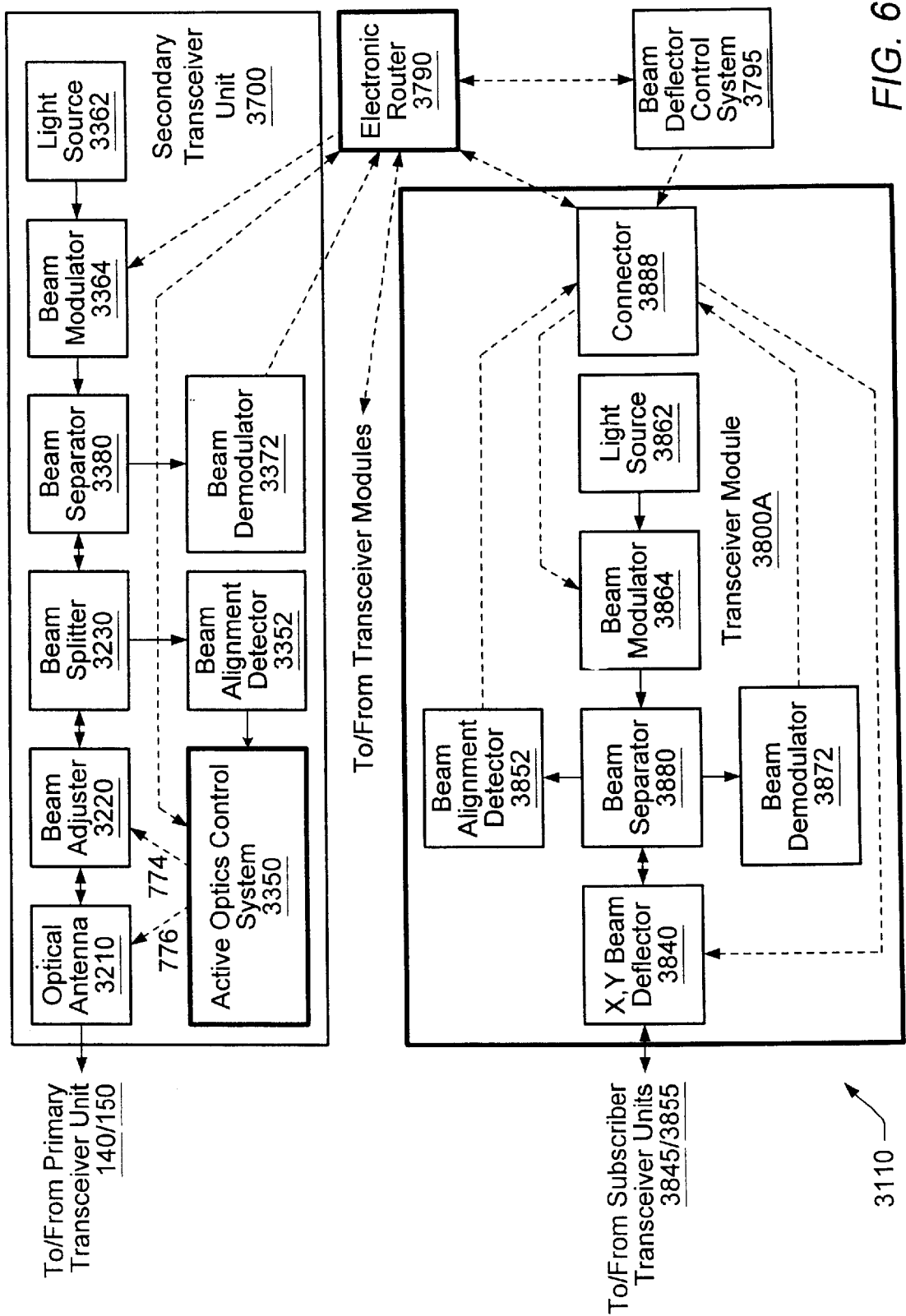
FIG. 6 is a block diagram of the optical router of FIG. 4, including a detailed block diagram of the secondary transceiver unit.

Referring now to FIG. 6, a block diagram of the optical router 3110 of FIG. 4 is shown including a detailed block diagram of the secondary transceiver unit 3700. A transceiver module 300A is coupled to the electronic router 3790 through the backplane 3889. The electronic router 3790 is also coupled to the other transceiver modules 3800 (not shown). The electronic router 3790 is coupled to the beam deflector control system 3795 and to the secondary transceiver unit 3700.

The secondary transceiver unit 3700 comprises an optical antenna 3210 which receives the first light beam 3140 from the primary transceiver unit 3120. The optical antenna 3210 also transmits the fourth light beam 3150 to the primary transceiver unit 3120. The optical antenna 3210 preferably comprises an optical system with a conic mirror, which is well known in the art. Alternatively the optical antenna 3210 is a collecting lens system which is also well known in the art. The optical antenna 3210 and associated optics converge and re-collimate the incoming first light beam 3140 to a relatively small diameter, preferably in the range of 1 to 3 millimeters. Conversely, the optical antenna 3210 receives a relatively small diameter fourth light beam 3150 generated by a light source 3362 and expands and re-collimates the fourth light beam 3150 for atmospheric transmission to the primary transceiver unit 3120.

The optical antenna 3210 atmospherically receives the first light beam 3140 including the data sent by the primary transceiver unit 3120 (of FIG. 1) from the primary transceiver unit 3120 and directs the first light beam 3140 to a beam demodulator 3372. The beam demodulator 3372 demodulates the data sent by the primary transceiver unit 3120 from the first light beam 3140 and communicates the data to the electronic router 3790. The data sent by the primary transceiver unit 3120 comprises subscriber data as well as control data. The control data comprises routing control information for the electronic router 3790 as well as timing control information and angular position control information of the subscriber transceiver units 3130 for the beam deflector control system 3795. The electronic router 3790 uses the routing control information to route the subscriber data to the appropriate transceiver modules 3800. The electronic router 3790 communicates the timing control information and the angular position control information to the beam deflector control system 3795. The beam demodulator 3372 preferably comprises a photo-diode as is common in the art.

The light source 3362 generates the fourth light beam 3150. The electronic router 3790 routes the data sent by the subscriber transceiver units 3130 from the transceiver modules 3800 to a beam modulator 3364. The beam modulator 3364 modulates the data sent by the subscriber transceiver units 3130 onto the fourth light beam 3150 for transmission to the optical antenna 3210 and on to the primary transceiver unit 3120.

The light source 3362 preferably comprises one or more continuous wave or pulsed beam lasers as are well known in the art, such as gas, solid state or diode lasers. The beam modulator 3364 preferably comprises an electro-optic cell. Alternatively, the beam modulator 3364 is a bulk type modulator. The light source and beam modulator configuration is indicative of those well known in fiber optic communication link transmission systems. However, the laser power output is typically significantly greater than those used in fiber optic systems.

As the first light beam 3140 passes from the optical antenna 3210 to the beam demodulator 3372 the first light beam 3140 is directed toward the beam demodulator 3372 by a beam separator 3380. Conversely, as the fourth light beam 3150 passes from the light source 3362 to the optical antenna 3210 the fourth light beam 3150 passes through the beam separator 3380.

The X-Y beam deflector 3840 is coupled through the backplane 3889 to the beam deflector control system 3795. The beam deflector control system 3795 controls the switching of the X-Y beam deflector 3840 to deflect the second light beam 3845 and third light beam 3855 to and from the desired subscriber transceiver unit 3130 at the desired time. Thus in a time-multiplexed fashion the beam deflector control system controls the establishing of the portion of the subscriber channels between the subscriber transceiver units 3130 and the transceiver modules 3800.

Preferably, the beam deflector control system 3795 receives control information from the primary transceiver unit 3120 to control the X-Y beam deflector 3840. The control information for the beam deflector control system 3795 contains information about the angular location of the subscriber transceiver units 3130. The beam deflector control system 3795 uses the subscriber transceiver unit angular location information to determine the desired deflection angles of the X-Y beam deflector 3840.

As mentioned in the discussion of FIG. 1, the primary transceiver unit 3120 also preferably transmits multiplexing control information to the optical router 3110 and to the subscriber transceiver units 3130. The primary transceiver unit 3120 transmits the control information for one or more subscriber channels prior to transmitting the subscriber data packets associated with the one or more subscriber channels. The multiplexing information is timing information used by the beam deflector control system 3795 to control the X-Y beam deflector 3840 regarding when to deflect the second and third light beams to and from a given subscriber transceiver unit 3130.

The subscriber transceiver unit transmits the third light beam 3855 containing data for the primary transceiver unit 3120 to the optical router 3110 at a time determined by the primary transceiver unit 3120. Correspondingly, the transceiver module servicing the subscriber transceiver unit transmits the second light beam with the data modulated for the subscriber transceiver unit to arrive at the X-Y beam deflector at substantially the same time as the third light beam 3855 containing data from the first subscriber arrives at the optical router 3110. The primary transceiver unit 3120 transmits the first light beam 3140 containing data for the subscriber transceiver unit to arrive at the optical router 3110 at a time such that the data may be demodulated, routed, modulated on the second light beam 3845 and the second light beam 3845 transmitted to arrive at the X-Y beam deflector 3840 at substantially the same time as the third light beam 3855 containing data from the first subscriber arrives at the optical router 3110.

By employing optical components to converge and re-collimate the light beams as described previously, the internal components of the optical router 3110, such as the beam deflector, advantageously operate on relatively narrow light beams. This improves the accuracy of beam redirection. Conversely, by employing optical components to expand and re-collimate the light beams as described previously, the light beams traveling through the atmosphere between network elements are advantageously relatively wide light beams. This improves the reception characteristics of the light beams as they are received by the network components.

The optical router 3110 further comprises an active optics control system 3350, such as are well known, particularly in the defense industry. The active optics control system 3350 provides stabilization of the first light beam 3140 on the optical antenna 3210 of the optical router 3110 and of the fourth light beam 3150 on the optical antenna 3710 (of FIG. 8) of the primary transceiver unit 3120. As the first light beam 3140 travels from the optical antenna 3210 toward the beam demodulator 3372, a small portion of the first light beam 3140 is split by a beam separator 3380 and redirected to a beam alignment detector 3352. The beam alignment detector 3352 detects misalignment or wander in the first light beam 3140 which may occur and stores the beam stabilization information. Atmospheric turbulence and density variations along the atmospheric path between the primary transceiver unit 3120 and the optical router 3110 may account for misalignment of the first light beam 3140 on the optical router 3110. Likewise, events such as ground shifting or tower sway may cause the positions of the primary transceiver unit 3120 or optical router 3110 relative to each other to change.

The active optics control system 3350 communicates the beam stabilization information to the electronic router 3790 which in turn communicates the beam stabilization information to the beam modulator 3364. The beam modulator 3364 modulates the beam stabilization information data onto the fourth light beam 3150 during a designated time period for atmospheric transmission to the primary transceiver unit 3120. The primary transceiver unit 3120 demodulates the beam stabilization information data from the fourth light beam 3150 and uses the beam stabilization information to make corrections and stabilize the first light beam 3140 on the optical router 3110.

Additionally, the active optics control system 3350 uses the beam misalignment information to control a beam adjuster 3220, positioned between the optical antenna 3210 and the beam splitter 3230, to adjust the first light beam 3140 optimally into the beam demodulator 3372.

As previously mentioned the primary transceiver unit 3120 communicates control information to the optical router 3110. The control information further comprises beam stabilization information. The active optics control system 3350 uses the beam stabilization information from the primary transceiver unit 3120 to control the optical antenna 3210 and beam adjuster 3220 to make corrections and stabilize the fourth light beam 3150 on the primary transceiver unit 3120.

Preferably the beam separator 3380 is a dichroic mirror. Alternatively, the first light beam 3140 and fourth light beam 3150 are orthogonally polarized and the beam separator 3380 is a polarization separator.

In the preferred embodiment of the invention, the optical router 3110 periodically polls the subscriber transceiver units 3130 by allocating a communication channel to each of the subscriber transceiver units 3130 within the range of accessibility of the optical router 3110. However, the optical router 3110 may lose reception of the third light beam 3855 from a given subscriber transceiver unit for a significant period of time. The most common cause of the reception loss is the subscriber transceiver unit being powered off. When the optical router 3110 detects reception loss, the optical router 3110 preferably and advantageously polls the powered-off subscriber less frequently than subscriber transceiver units which are actively transmitting a third light beam 3855 to the optical router 3110.

Alternate Embodiment

Figure 7:
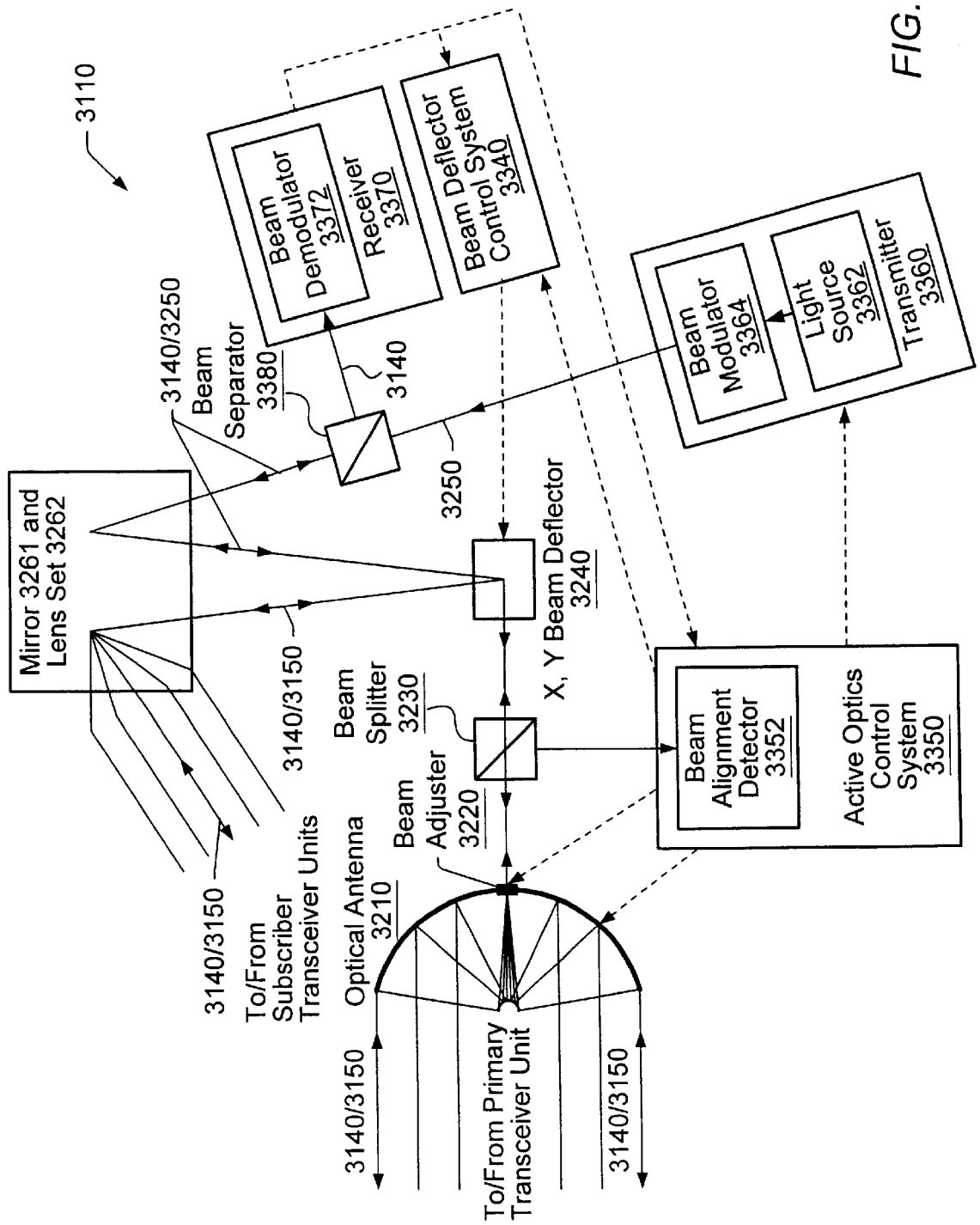
FIG. 7 illustrates the optical router in the network of FIG. 3.

Referring now to FIG. 7, an alternate embodiment of the optical router 3110 in the network 3100 (of FIG. 3) is shown. The optical router 3110 comprises an optical antenna 3210 which receives the first light beam 3140 from the primary transceiver unit 3120. The optical antenna 3210 also transmits the second light beam 3150 received from a subscriber transceiver unit to the primary transceiver unit 3120. The optical antenna 3210 preferably comprises an optical system with a conic mirror, which is well known in the art. In an alternate embodiment the optical antenna 3210 is a collecting lens system which is also well known in the art. The optical antenna 3210 and associated optics converge and re-collimate the incoming first light beam 3140 to a relatively small diameter, preferably in the range of 1 to 3 millimeters. Conversely, the optical antenna 3210 receives a relatively small diameter second light beam 3150 received from internal components of the optical router 3110 and expands and re-collimates the second light beam 3150 for atmospheric transmission to the primary transceiver unit 3120.

The optical antenna 3210 receives the first light beam 3140 from the primary transceiver unit 3120 (of FIG. 3) and directs the first light beam 3140 to an X-Y beam deflector 3240. The beam deflector 3240 receives the first light beam 3140 and deflects the first light beam 3140 toward a mirror 3261. The mirror 3261 reflects the first light beam 3140 to a respective one or more of the subscriber transceiver units 3130 (of FIG. 3). Conversely, the subscriber transceiver units 3130 transmit respective second light beams 3150 to the mirror 3261. The mirror 3261 reflects a received second light beam 3150 to the beam deflector 3240. The beam deflector 3240 deflects the second light beam 3150 to the optical antenna 3210. The optical antenna 3210 receives the second light beam 3150 and transmits the second light beam 3150 to the primary transceiver unit 3120.

Preferably, during a first time period, the beam deflector 3240 deflects the first light beam 3140 from the optical antenna 3210 to a location on the mirror 3261 and deflects the second light beam 3150 from substantially the same location on the mirror to the optical antenna 3210. The location on the mirror 3261 is calculated to reflect the first light beam 3140 to a particular subscriber transceiver unit and reflect the second light beam 3150 from the particular subscriber transceiver unit. Hence, the optical router 3110 establishes a bi-directional communications channel using the first and second light beams between the primary transceiver unit 3120 and one of the subscriber transceiver units 3130 for a period of time. During subsequent periods of time the beam deflector 3240 deflects the light beams to other locations on the mirror 3261 in order to establish channels with the other subscriber transceiver units 3130 serviced by the optical router 3110. In this manner, a wireless point-to-multipoint bi-directional wide area telecommunications network is advantageously formed.

The beam deflector 3240 is controlled by a beam deflector control system 3340 coupled to the beam deflector 3240. The beam deflector control system 3340 controls the beam deflector 3240 to deflect the light beams to the desired locations on the mirror 3261 during the desired time. Preferably, the beam deflector control system 3340 receives control information from the primary transceiver unit 3120 to control the beam deflector 3240. The control information for the optical router 3110 contains information about the angular location of the subscriber transceiver units 3130. The beam deflector control system 3340 uses the subscriber transceiver unit angular location information to determine the desired locations on the mirror 3261 used for deflection of the light beams.

As mentioned in the discussion of FIG. 3, the primary transceiver unit 3120 also preferably transmits multiplexing control information to the optical router 3110 and to the subscriber transceiver units 3130. The primary transceiver unit 3120 transmits the control information for one or more subscriber channels prior to transmitting the subscriber data packets associated with the one or more subscriber channels. Preferably, the multiplexing information is timing information used by the beam deflector control system 3340 to control the beam deflector 3240 regarding when to deflect the light beams to and from a particular location on the mirror 3261. A first subscriber transceiver unit 3130 transmits the second light beam 3150 containing data for the primary transceiver unit 3120 to the optical router 3110 at a time determined by the primary transceiver unit 3120. Correspondingly, the primary transceiver unit 3120 transmits the first light beam 3140 containing data for the first subscriber to the optical router 3110 at a time such that the first light beam 3140 containing data for the first subscriber arrives at the optical router 3110 at substantially the same time the second light beam 3150 containing data from the first subscriber arrives at the optical router 3110. Additionally, the beam deflector control system 3340 controls the beam deflector 3240 to redirect the first and second light beams between the primary transceiver unit 3120 and first subscriber transceiver unit 3130 during the time when the first and second light beams are passing through the optical router 3110, as directed by the primary transceiver unit 3120.

Preferably, the X-Y beam deflector 3240 is a galvanometer mirror pair. Galvanometer mirrors are well known, particularly in the art of laser printer technology and the art of laser light shows.

One embodiment contemplates the beam deflector 3240 comprising a plurality of such galvanometer mirror pairs. Each galvanometer mirror pair deflects a different light beam between the mirror 3261 and the optical antenna 3210. The primary transceiver unit 3120 transmits the first light beam 3140 which is comprised of multiple light beams each of a different wavelength, i.e., the first light beam 3140 includes a plurality of different wavelengths. The optical router 3110 splits the first light beam 3140 into respective wavelength portions which are deflected by respective beam deflectors. Conversely, multiple subscriber transceiver units 3130 transmit second light beams 3150 of differing wavelengths which arrive simultaneously at the optical router 3110. The optical router 3110 combines the multiple wavelength second light beams 3150 and transmits the multiple wavelength second light beam 3150 to the primary transceiver unit 3120.

Other embodiments contemplate the beam deflector 3240 comprising one or more acousto-optic or solid state beam deflectors.

Preferably the mirror 3261 is a conical or hemispherical mirror wherein the cone axis is in a vertical orientation, thus providing 360 degree access to subscribers with an elevation aperture covering the access area to a range of approximately between 2000 and 4000 feet. The mirror 3261 is circumscribed by a lens set 3262. The lens set 3262 preferably comprises a plurality of relatively small positive lenses arrayed in a conical or hemispherical fashion. As the relatively small diameter first light beam 3140 reflects from the mirror 3261, the first light beam 3140 expands in diameter. The lens set 3262 re-collimates the expanding first light beam 3140 back to a slightly converging first light beam 3140 for atmospheric transmission to the subscriber transceiver units 3130. Conversely, the lens set 3262 focuses the second light beam 3150 from the subscriber transceiver units 3130 onto the mirror 3261. An aperture is formed in the lens set 3262 through which the relatively small diameter first and second light beams travel between the X-Y beam deflector 3240 and the mirror 3261. The mirror 3261 and lens set 3262 collimate beam 3150 in a manner optimized for the optical router 3261 access area.

By employing optical components to converge and re-collimate the light beams as described previously, the internal components of the optical router 3110, such as the beam deflector, advantageously operate on relatively narrow light beams. This improves the accuracy of beam redirection. Conversely, by employing optical components to expand and re-collimate the light beams as described previously, the light beams traveling through the atmosphere between network elements are advantageously relatively wide light beams. This improves the reception characteristics of the light beams as they are received by the receivers of the network components.

The optical router 3110 further comprises a receiver 3370 and a beam separator 3380. Preferably, the optical router 3110 establishes a control channel between the primary transceiver unit 3120 and the optical router 3110 for use in communicating control information, as previously discussed, from the primary transceiver unit 3120 to the optical router 3110. The control channel is distinct from the subscriber channels. Preferably, the beam deflector control system 3340 controls the beam deflector 3240 to redirect a particular first light beam 3140 to the beam separator 3380 rather than to the subscriber transceiver units 3130. This redirection to the beam separator 3380 rather than to the subscriber units 3130 preferably occurs at preset periods of time. The beam separator 3380 redirects the particular first light beam 3140 to the receiver 3370, which receives the first light beam 3140. The primary transceiver unit 3120 correspondingly modulates the control information data on the first light beam 3140 to be received and demodulated by the beam demodulator 3372 in the receiver 3370. The receiver 3370 is coupled to the beam deflector control system 3340 and communicates the control information data to the beam deflector control system 3340. The beam demodulator 3372 preferably comprises a photo-diode as is common in the art.

Preferably, the control channel is established in a time-multiplexed manner. During a time period, which is distinct from time periods devoted to subscriber channels, the beam control system 3340 controls the beam deflector 3240 to deflect the first light beam 3140 to a location on the mirror 3261 such that the first light beam 3140 is reflected to the beam separator 3380 rather than to the subscriber transceiver units 3130. The primary transceiver unit 3120 instructs the optical router 3110 to establish this control channel prior to the time for the optical router 3110 to establish the control channel. Preferably, during initialization, the optical router 3110 devotes all communication channels to be control channels until instructed by the primary transceiver unit 3120 to allocate subscriber channels.

In an alternate embodiment, the control channel is established in a frequency-multiplexed manner wherein a light beam of a distinct frequency, which is distinct from frequencies devoted to subscriber channels, is devoted to control channels.

The optical router 3110 further comprises an active optics control system 3350, such as are well known, particularly in the defense industry. The active optics control system 3350 provides stabilization of the first light beam 3140 on the optical antenna 3210 of the optical router 3110 and the second light beam 3150 on the optical antenna 3710 (of FIG. 8) of the primary transceiver unit 3120. As the first light beam 3140 travels from the optical antenna 3210 to the beam deflector 3240, a small portion of the first light beam 3140 is split by a beam splitter 3230 and redirected to a beam alignment detector 3352. The beam alignment detector 3352 detects misalignment or wander in the first light beam 3140 which may occur and stores the beam stabilization information. Atmospheric turbulence and density variations along the atmospheric path between the primary transceiver unit 3120 and the optical 3110 may account for misalignment of the first light beam 3140 on the optical router 3110. Likewise, events such as ground shifting or tower sway may cause the positions of the primary transceiver unit 3120 or optical router 3110 relative to each other to change.

The active optics control system 3350 communicates the beam stabilization information to the primary transceiver unit 3120 on a control channel. The primary transceiver unit 3120 uses the beam stabilization information to make corrections and stabilize the first light beam 3140 on the optical router 3110.

The optical router 3110 further comprises a transmitter 3360 including a light source 3362 and a beam modulator 3364. The active optics control system 3350 provides the beam stabilization information of the first light beam 3140 to the transmitter 3360. The light source 3362 generates and atmospherically transmits a control light beam 3250. The beam modulator 3364 modulates the positional information on the control light beam 3250 as it travels through the beam separator 3380 to the mirror 3261. Thus a control channel is established between the optical router 3110 and the primary transceiver unit 3120, similar to the control channel described above in which the primary transceiver unit 3120 transmits control information to the optical router 3110, but in the opposite direction. That is, while the beam deflector 3240 is controlled to deflect the first light beam 3140 to the mirror 3261 such that the mirror 3261 reflects the first light beam 3140 to the receiver 3370, the beam deflector 3240 also deflects the control light beam 3250 from the mirror 3261 to the optical antenna 3210. This provides a two-way or bi-directional control channel.

The optical router 3110 light source 3362 preferably comprises one or more continuous wave or pulsed beam lasers as are well known in the art, such as gas, solid state or diode lasers. The beam modulator 3364 preferably comprises an electro-optic cell. Alternatively, the beam modulator 3364 is a bulk type modulator. The light source and beam modulator configuration is indicative of those well known in fiber optic communication link transmission systems. However, the laser power output is typically significantly greater than those used in fiber optic systems.

Additionally, the active optics control system 3350 uses the beam misalignment information to control the beam adjuster 3220 to adjust the first light beam 3140 optimally into the beam deflector 3240.

As previously mentioned the primary transceiver unit 3120 communicates control information to the optical router 3110. The control information further comprises beam stabilization information which the optical router 3110 receives on the control channels. The active optics control system 3350 of the optical router 3110 uses the beam stabilization information from the primary transceiver unit 3120 to control the optical antenna 3210 and beam adjuster 3220 to make corrections and stabilize the second light beam 3150 on the primary transceiver unit 3120.

In an alternate embodiment, the optical router active optics control system 3350 further comprises a second beam alignment detector (not shown) which detects misalignment or wander in the second light beam 3150 from the subscriber transceiver units 3130 and stores the beam stabilization information. The optical router 3110 communicates the beam stabilization information to the primary transceiver unit 3120. The primary transceiver unit 3120 in turn communicates the beam stabilization information to the subscriber transceiver units 3130. The active optics control systems in the subscriber transceiver units 3130, discussed below, use the beam stabilization information from the primary transceiver unit 3120 to control the subscriber transceiver unit optical antennas and beam adjusters to make corrections for misalignment or wander and stabilize the second light beam 3150 on the optical router 3110.

In one embodiment the beam separator 3380 is a dichroic mirror. In another embodiment, the first light beam 3140 and second light beam 3150 are orthogonally polarized and the beam separator 3380 is a polarization separator.

Preferably, the optical router 3110 periodically polls the subscriber transceiver units 3130 by allocating a communication channel to each of the subscriber transceiver units 3130 within the range of accessibility of the optical router 3110. However, the optical router 3110 may lose reception of the second light beam 3150 from a given subscriber transceiver unit for a significant period of time. The most common cause of the reception loss is the subscriber transceiver unit being powered off. When the optical router 3110 detects reception loss, the optical router 3110 preferably and advantageously polls the powered-off subscriber less frequently than subscriber transceiver units which are actively transmitting a second light beam 3150 to the optical router 3110.

The Primary Transceiver Unit

Figure 8:
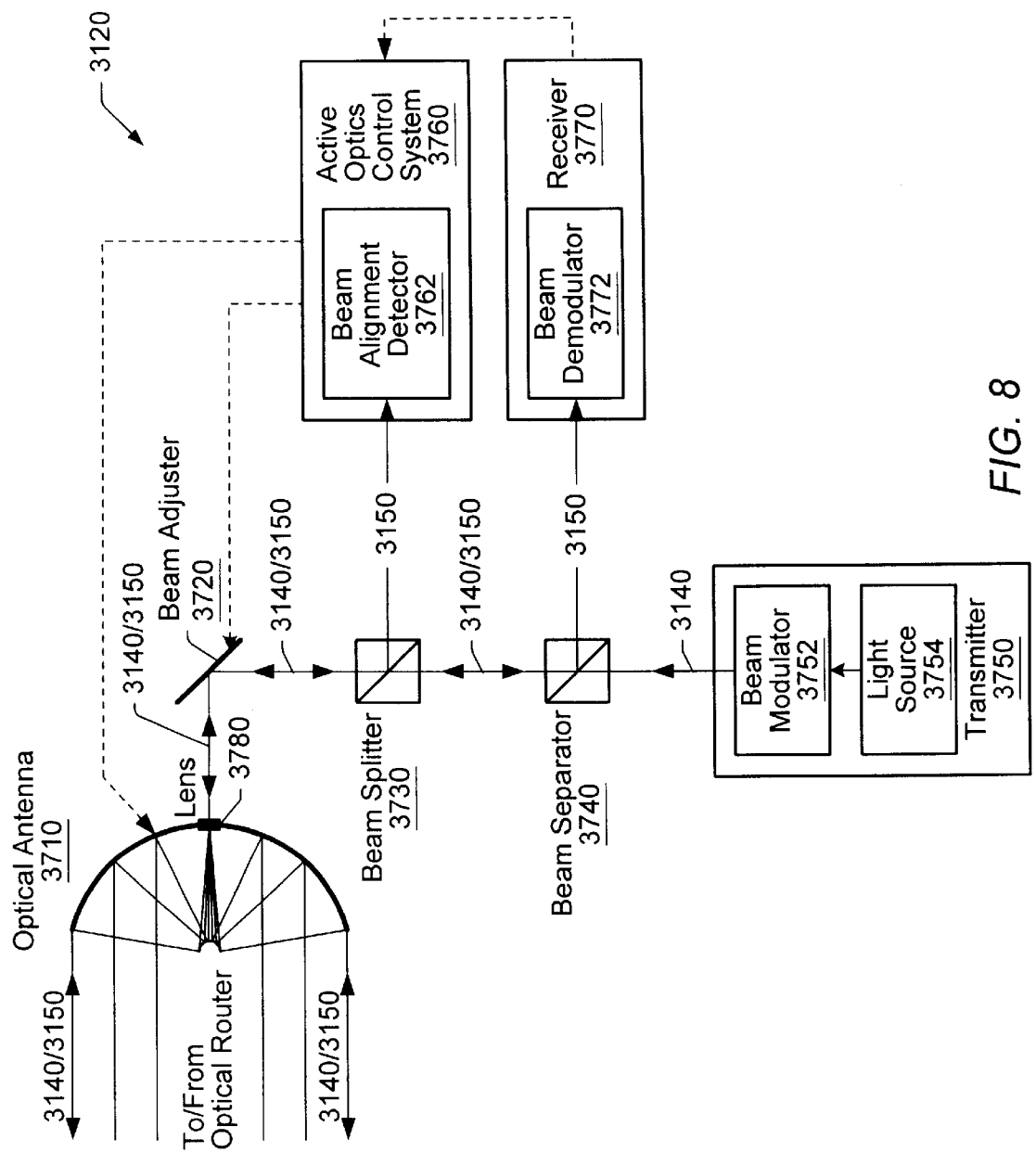
FIG. 8 illustrates the primary transceiver unit of FIGS. 1 and 3.

Referring now to FIG. 8, the preferred embodiment of the primary transceiver unit 3120 in the network 3100 (of FIG. 1) is shown. The primary transceiver unit 3120 comprises an optical antenna 3710 optically coupled to a transmitter 3750 and a receiver 3770.

The optical antenna 3710 transmits the first light beam 3140 to the optical router 3110 (of FIG. 1) and receives the fourth light beam 3150 from the optical router 3110. (It is noted that for the network 3100 where the alternate embodiment of the optical router 3110 is employed, i.e., the network of FIG. 3, the optical antenna 3710 receives the second light beam 3150.) The optical antenna 3710 preferably is similar to the optical antenna 3210 of the optical router 3110. An optical antenna 3710 of the primary transceiver unit 3120 is contemplated with different dimensions and optical characteristics than the optical antenna 3210 of the optical router 3110.

The optical antenna 3710 of the primary transceiver unit 3120 is preferably larger than the subscriber transceiver unit optical antenna. Preferably, the receiver 3770 of the primary transceiver unit 3120 is more sensitive, i.e., able to demodulate a weaker light beam, than that of the subscriber transceiver units. Thus the subscriber transceiver unit light source, discussed below, may be less powerful, thus reducing the cost of the subscriber transceiver units. In other words, the primary transceiver unit 3120 transmitter light source 3754 is preferably more powerful than the subscriber transceiver unit light source. This allows the subscriber transceiver unit antenna, discussed below, to be relatively small and the subscriber transceiver unit receiver, discussed below, to be relatively less sensitive. Hence the total cost of the system is reduced since the number of subscriber transceiver units is typically much greater than the number of primary transceiver units in the network.

A data source/sink (not shown) provides data to the primary transceiver unit 3120 to be sent to the subscriber transceiver units 3130. The data source/sink ties into and/or uses existing communication structures such as a telephone network, cable television system, the Internet or other networks employing Asynchronous Transfer Mode (ATM), switched-ethernet, SONNET, FDDI, Fibre-Channel, Serial Digital Heirarchy, etc. Various means for coupling the data source/sink to the primary transceiver unit 3120 are contemplated, such as fiber-optic cable, satellite up-links and down-links, atmospheric light beams, coaxial cable, microwave links, etc. The light source 3754 generates and atmospherically transmits the first light beam 3140 upon which the beam modulator 3752 modulates the data to be sent to the subscriber transceiver units 3130. A beam adjuster 3720, which preferably comprises an adjustable fine steering mirror, receives and reflects the first light beam 3140 to a lens assembly 3780 and optical antenna 3710 which expand, re-collimate and transmit the first light beam 3140 to the optical router 3110.

Conversely, the primary transceiver unit optical antenna 3710 atmospherically receives the fourth light beam 3150 from the optical router 3110, and the lens assembly 3780 focuses the fourth light beam 3150 onto the beam adjuster 3720. The beam adjuster 3720 reflects the narrowed fourth light beam 3150 to a beam separator 3740. The beam separator 3740 is similar to that of the optical router 3110. The beam separator 3740 redirects the fourth light beam 3150 to the receiver 3770. The beam demodulator 3772 receives the fourth light beam 3150 and demodulates the data sent by the subscriber transceiver units 3130. The data is then provided to the data source/sink. The beam demodulator 3772 preferably comprises a photo-diode, as is common in the art.

The primary transceiver unit light source 3754 preferably comprises one or more continuous wave or pulsed beam lasers as are well known in the art, such as gas, solid state or diode lasers. The beam modulator 3752 preferably comprises an electro-optic cell. Alternatively, the beam modulator 3752 is a bulk type modulator. The light source and beam modulator configuration is similar to those well known in fiber optic communication link transmission systems. However, the laser power output is typically significantly greater than those used in fiber optic systems.

The light beam wavelengths generated by the atmospherically transmitting light sources described in the present invention are chosen to minimize the power loss through the atmosphere. Preferably the wavelengths are in the near infrared range.

The lens assembly 3780 and optical antenna 3710 are configured to transmit the first light beam 3140 having a beam waist which is advantageously located at the optical router 3110. The diameter of the first light beam 3140 leaving the optical antenna 3710 is many times the diameter of the first light beam 3140 exiting the light source 3754. Thus the laser power density is spread over a relatively large, cross-sectional area, which enhances eye-safety. Additionally, the relatively large diameter of the light beams traveling between the components of the network improves the reception characteristics of the light beams at the optical receivers.

The primary transceiver unit 3120 additionally comprises a control system (not shown) which computes the previously discussed routing, beam stabilization, timing, subscriber location and multiplexing control information.

The primary transceiver unit 3120 further comprises an active optics control system 3760 similar to the active optics control system 3350 of the optical router 3110. The primary transceiver unit active optics control system 3760 cooperates with the optical router active optics control system 3350 to provide stabilization of the first light beam 3140 on the optical antenna 3210 of the optical router 3110 and the fourth light beam 3150 on the optical antenna 3710 of the primary transceiver unit 3120.

As previously mentioned, the optical router 3110 communicates beam stabilization information to the primary transceiver unit 3120. The active optics control system 3760 uses the beam stabilization information from the optical router 3110 to control the optical antenna 3710 and beam adjuster 3720 to make corrections and stabilize the first light beam 3140 on the optical router 3110.

Additionally, the active optics control system 3760 uses the beam misalignment information detected by the beam alignment detector 3762 to control the beam adjuster 3720 to adjust the fourth light beam 3150 optimally into the receiver 3770.

The Subscriber Transceiver Units

Figure 9:
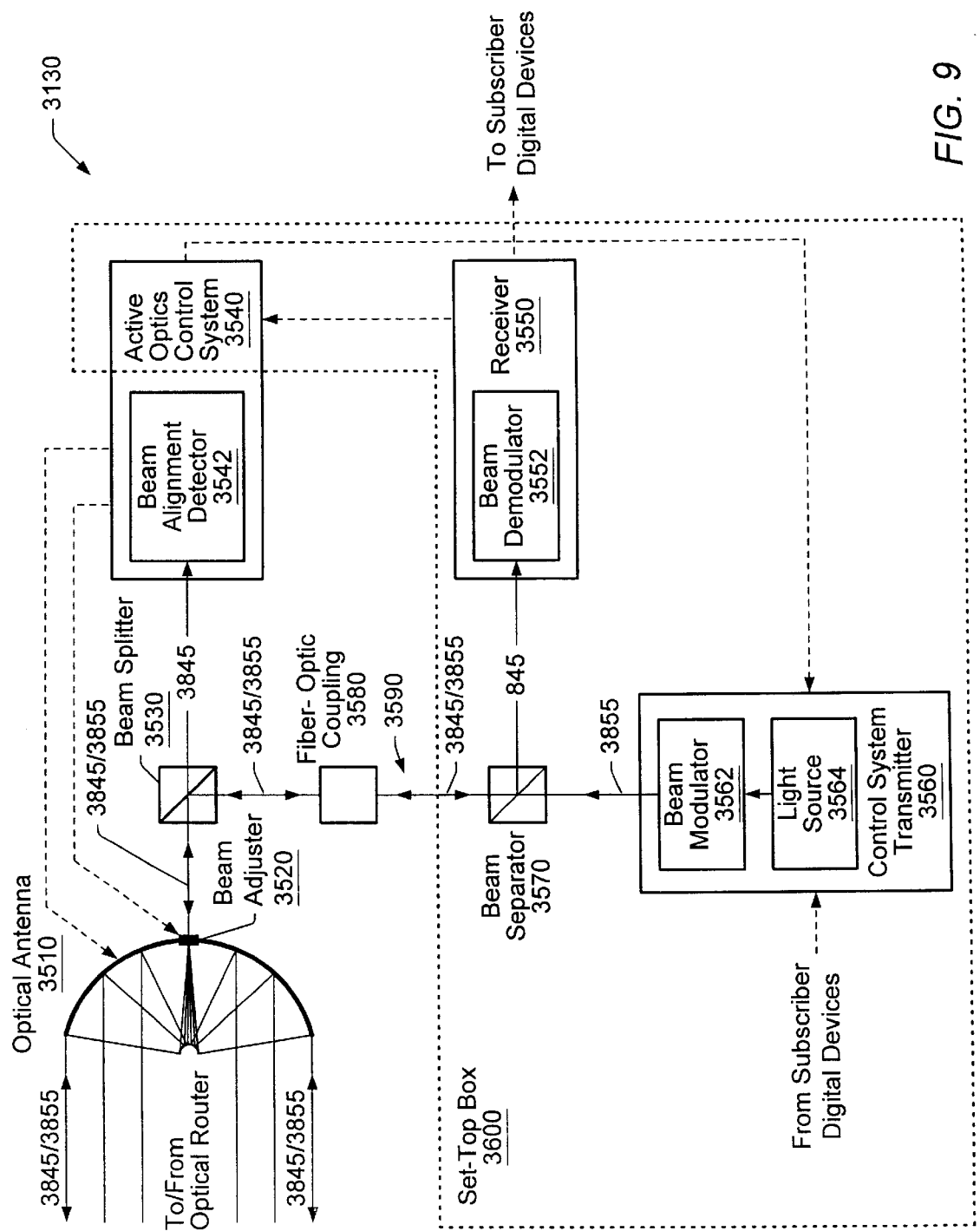
FIG. 9 illustrates a subscriber transceiver unit of FIGS. 1 and 3.

Referring now to FIG. 9, an illustration of the preferred embodiment of a subscriber transceiver unit 3130A in the network 3100 (of FIG. 1) is shown. Subscriber transceiver unit 3130A is representative of the plurality of subscriber transceiver units 3130. The subscriber transceiver unit 3130A comprises an optical antenna 3510 coupled to an input/output device 3600, such as a set-top box 3600, by a fiber optic cable 3590. The input/output device 3600 may be any of various devices, including a set-top box, computer system, television, radio, teleconferencing equipment, telephone or others which may be coupled to the optical antenna 3510 by a fiber optic cable 3590. In the remainder of this disclosure, the input/output device 3600 is referred to as a set top box. Power and control wires (not shown) also couple the subscriber optical antenna 3510 and the set-top box 3600.

The optical antenna 3510 receives the second light beam 3845 from the optical router 3110 (of FIG. 1) and transmits the third light beam 3855 to the optical router 3110. (It is noted that for the network 3100 where the alternate embodiment of the optical router 3110 is employed, i.e., the network of FIG. 3, the subscriber transceiver unit 3130A receives the first light beam 3140 from the optical router 3110 and transmits the second light beam 3150 to the optical router 3110.) The optical antenna 3510 preferably is similar to the optical antenna 3210 of the optical router 3110. An optical antenna 3510 of the subscriber transceiver unit 3130A is contemplated with different dimensions and optical characteristics than the optical antenna 3210 of the optical router 3110.

The optical antenna 3510 receives the second light beam 3845 and focuses the second light beam 3845 into a fiber-optic coupling 3580. The fiber-optic coupling 3580 couples the second light beam 3845 into the fiber optic cable 3590. The fiber optic cable 3590 carries the second light beam 3845 to the set-top box 3600. A beam separator 3570 in the set-top box 3600 redirects the second light beam 3845 to a receiver 3550 which receives the second light beam 3845. A beam demodulator 3552 in the receiver 3550 demodulates the data from the second light beam 3845. The receiver 3550 provides the data to external connections (not shown) on the set-top box 3600, which connect to various devices such as televisions, computers, radios, teleconferencing equipment and telephones (also not shown). The beam demodulator 3552 preferably comprises a photo-diode as is common in the art.

Conversely, the various digital devices provide data to be sent to the primary transceiver unit 3120 (of FIG. 1) to a transmitter 3560 in the set-top box 3600. The set-top box 3600 comprises a light source 3564 which generates the third light beam 3855. A beam modulator 3562 in the transmitter 3560 modulates the data to be sent to the primary transceiver unit 3120 on the third light beam 3855. The third light beam 3855 passes through the fiber optic cable 3590 to the fiber-optic coupling 3580. The fiber optic coupling 3580 decouples the third light beam 3855 from the fiber optic cable 3590 and atmospherically redirects the third light beam 3855 to the optical antenna 3510. The optical antenna 3510 then transmits the third light beam 3855 including the data to the optical router 3110.

The subscriber transceiver unit 3130A light source 3564 preferably comprises one or more continuous wave or pulsed beam lasers as are well known in the art, such as gas, solid state or diode lasers. The beam modulator 3562 preferably comprises an electro-optic cell. Alternatively, the beam modulator 3562 is a bulk type modulator. The light source and beam modulator configuration is similar to those well known in fiber optic communication link transmission systems. However, the laser power output is typically greater than those used in fiber optic systems.

In an alternate embodiment, previously mentioned, the subscriber transceiver unit 3130A is configured to transmit and receive multiple wavelength light beams in order to increase the data bandwidth available to a given subscriber.

The subscriber transceiver unit 3130A further comprises an active optics control system 3540 similar to the active optics control system of the optical router 3110 and the primary transceiver unit 3120. The subscriber transceiver unit active optics control system 3540 cooperates with the primary transceiver unit 3120 active optics control system to provide stabilization of the second light beam 3845 on the subscriber transceiver unit 3130A and the third light beam 3855 on the optical router 3110.

A beam alignment detector 3542 detects misalignment or wander in the second light beam 3845 from the optical router 3110 and stores the beam stabilization information. The subscriber transceiver unit 3130A communicates the beam stabilization information regarding the first light beam 3150 to the primary transceiver unit 3120 via the transmitter 3560. The invention contemplates the beam stabilization information being communicated to the primary transceiver unit 3120 in a header in a subscriber data packet. The invention additionally contemplates the beam stabilization information being communicated to the primary transceiver unit 3120 via a dedicated control data packet. The primary transceiver unit 3120 utilizes the beam stabilization information when computing positional and multiplexing control information.

A beam adjuster 3520 optically positioned between the optical antenna 3510 and the fiber optic coupling 3580 is controlled by the active optics control system 3540 to maintain efficient coupling of the second light beam 3845 into the fiber optic cable 3590.

The optical antenna 3510 is mounted on gimbals (not shown) which allow the optical antenna 3510 to rotate and search for an optical router 3110, or different transceiver module 3800 of the preferred optical router 3110, by which to receive service upon installation or upon loss of reception from a current optical router 3110 or transceiver module 3800.

Alternate Embodiments

An alternate embodiment of the subscriber transceiver unit 3130A is contemplated in which the light beams are converted to/from electrical signals at the optical antenna 3510 and transmitted in electronic form to the input/output device 3600. Hence, alternative transmission mediums for coupling the optical antenna 3510 to the input/output device 3600 are contemplated such as coaxial cable or other forms of electrical wires.

Figure 10:
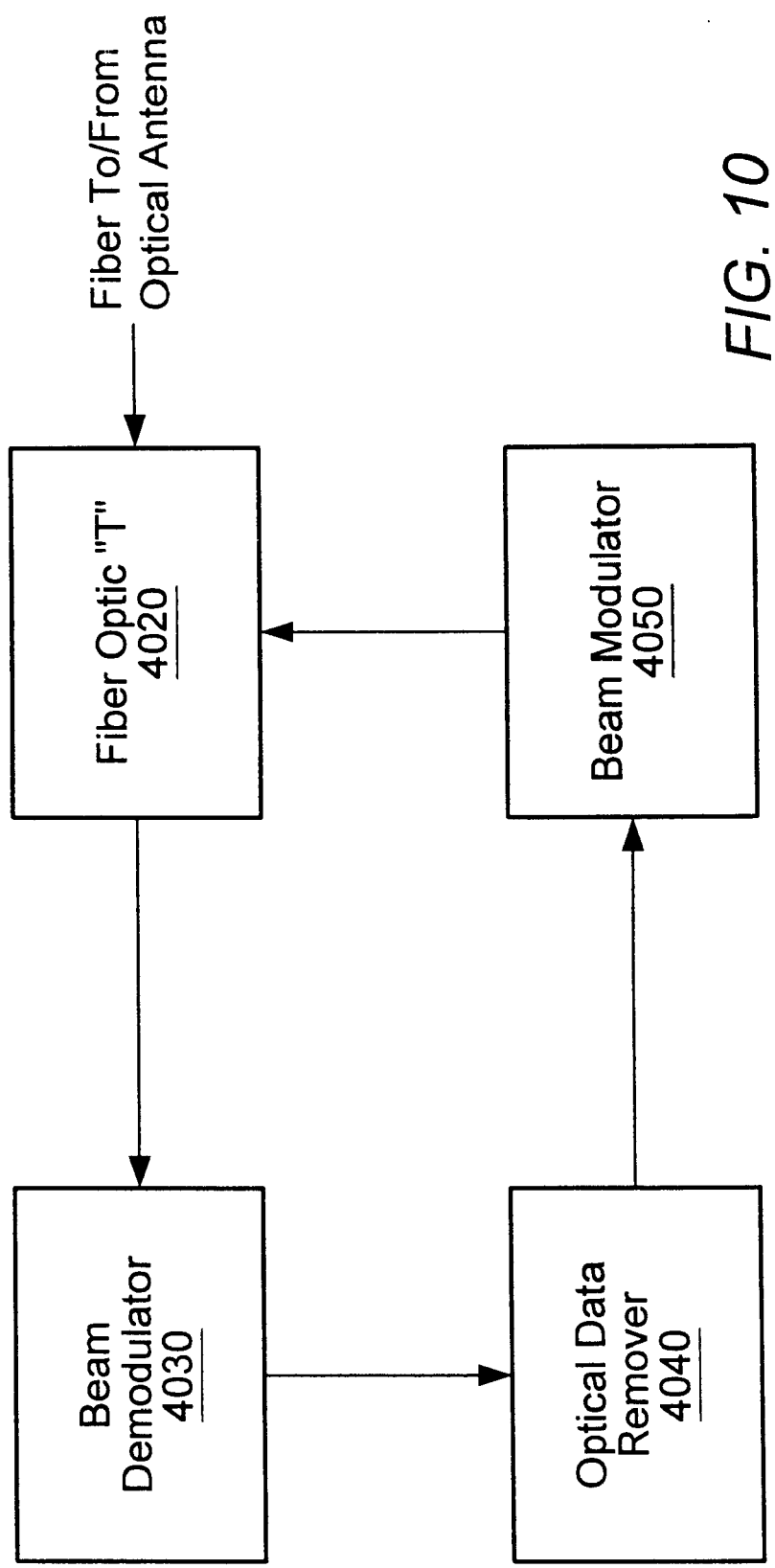
FIG. 10 is a block diagram of a portion of an alternate embodiment of the subscriber transceiver unit of FIG. 9.

Referring now to FIG. 10, an alternate embodiment of the set-top box 3600 of FIG. 9 is shown. A fiber optic "T" 4020 is coupled to the fiber optic cable 3590. The second light beam 3845 enters the fiber optic "T" 4020 and passes along the fiber optic cable 3590 to a beam demodulator 4030. The beam demodulator 4030 is similar to and performs similar functions to the beam demodulator 3552 of the preferred embodiment. The second light beam 3845 then passes through the fiber optic cable 3590 to an optical data remover 4040. The optical data remover 4040 preferably comprises a micro-bender. The data remover 4040 removes any data which has been modulated on the second light beam 3845. At this point the second light beam 3845 essentially becomes the third light beam 3855. The third light beam 3855 is then passed along the fiber optic cable 3590 to a beam modulator 4050. The beam modulator 4050 is similar to and performs similar functions to the beam modulator 3562 of the preferred embodiment of the subscriber transceiver unit 3130A. The third light beam 3855 including the second data is then passed to the fiber optic "T" 4020 and on to the fiber optic coupling for transmission to the optical router 3110. The alternate embodiment advantageously avoids the cost of a light source.

An alternate embodiment of the subscriber transceiver unit 3130A optical antenna is contemplated in which the antenna is an omni-directional antenna. The omni-directional antenna is similar to the mirror and lens set assembly of the alternate embodiment of the optical router 3110. Additionally, a beam deflector is provided for coupling and decoupling the light beams into and out of the fiber optic coupling 3580. Alternatively, the fiber optic coupling 3580 is rotatably mounted. The alternate embodiment advantageously enables the subscriber unit 3130 to receive service from an alternate optical router 3110 with minimal interruption of data transmission. In addition, installation of the subscriber transceiver unit 3130 is simplified in that virtually no alignment must be performed upon installation, other than achieving a line of sight path to one or more optical routers 3110.

The present invention contemplates the use of fiber optic amplifiers, such as an EDFA (erbium-doped fiber amplifier), in one or more of the various network elements for amplifying the various light beams in order to achieve appropriate signal power levels of the various light beams within the network.

The present invention contemplates the use of atomic line filters, which act as optical band-pass filters for selected light wavelengths, in one or more of the various network element receivers for filtering out necessary light wavelengths, such as sunlight.

The present invention contemplates the use of light sources in the various network element transmitters with adjustable light beam power control. The light beam power is adjusted according to factors such as weather conditions to achieve a proper fade margin for the signal power. A fade margin of 15 dB at a 1 km range to achieve a $10^{-9}$ bit error rate is preferred.

Conclusion

Therefore, the present invention comprises a wireless point-to-multipoint wide area telecommunications network by establishing subscriber communications channels in a multiplexed manner using atmospherically transmitted light beams. The network employs an optical router to establish the communications channels between a primary transceiver unit and a plurality of subscriber transceiver units by time-multiplexing, light beam frequency multiplexing, or a combination thereof, the atmospherically transmitted light beams.

Although the systems and networks of the present invention have been described in connection with several preferred embodiments, the present invention is not intended to be limited to the specific forms set forth herein, but on the contrary, it is intended to cover such alternatives, modifications, and equivalents, as can be reasonably included within the spirit and scope of the invention as defined by the appended claims.

What is claimed is:

1. A point-to-multipoint wide area communications network employing atmospheric optical communication, comprising:

a primary transceiver unit comprising a primary light source configured to generate a first light beam, wherein said primary transceiver unit is configured to modulate first data on said first light beam, and to transmit said modulated first light beam into the atmosphere;

a first optical router; and a plurality of subscriber transceiver units;

wherein said first optical router is configured to receive said modulated first light beam from the atmosphere and redirect portions of said modulated first light beam through the atmosphere to said plurality of subscriber transceiver units;

wherein each of said plurality of subscriber transceiver units is configured to receive one or more of said portions of said modulated first light beam from said first optical router through the atmosphere; and wherein each of said plurality of subscriber transceiver units is configured to demodulate at least a portion of said first data from said one or more portions of said modulated first light beam;

wherein said primary transceiver unit, said first optical router and said plurality of subscriber transceiver units comprise a wide area optical telecommunications network.

2. The network of claim 1, wherein a first of said subscriber transceiver units is configured to provide said portion of said first data to one or more communication devices.

3. The network of claim 2, wherein a first of said one or more communication devices is a computer, a television, a telephone, or a video conferencing system.

4. The network of claim 1, wherein the primary transceiver unit is configured to receive said first data from one or more data sources.

5. The network of claim 4,
wherein a first of said one or more data sources is a telephone network, a cable television system, the Internet, a network employing Asynchronous Transfer Mode (ATM), a network employing switched-Ethernet, a network employing SONNET, a network employing FDDI, a network employing Fibre-Channel, or a network employing Serial Digital Hierarchy.

6. The network of claim 1,
wherein each of said plurality of subscriber transceiver units is configured to modulate a corresponding second data packet on a corresponding second light beam, and to transmit the modulated second light beam to the first optical router through the atmosphere;
wherein said first optical router is configured to receive a plurality of said modulated second light beams from said plurality of subscriber transceiver units, and to redirect said modulated second light beams to said primary transceiver unit through the atmosphere; and
wherein said primary transceiver unit is further configured to receive said modulated second light beams, and to demodulate said second data packets from said modulated second light beams.

7. The network of claim 6,
wherein the modulated first light beam and the modulated second light beams follow paths through the atmosphere between the primary transceiver unit and the first optical router which are substantially collinear.

8. The network of claim 6,
wherein the first optical router comprises an optical antenna, a mirror, and a first X-Y beam deflector;
wherein the mirror is configured to receive one or more of the modulated second light beams, transmitted by one or more said plurality of the subscriber transceiver units, from the atmosphere, and to reflect the one or more modulated second light beams to the first X-Y beam deflector;
wherein the first X-Y beam deflector is configured to deflect the one or more modulated second light beams to the optical antenna; and
wherein the optical antenna is configured to direct the one or more modulated second light beams to the primary transceiver unit through the atmosphere.

9. The network of claim 6, wherein the first light beam and second light beam are orthogonally polarized.

10. The network of claim 6,
wherein the primary transceiver unit comprises a primary optical antenna and a primary beam alignment detector;
wherein the primary optical antenna is configured to receive the modulated second light beams from the atmosphere;
wherein the primary beam alignment detector is configured to receive at least a portion of the modulated second light beams, detect misalignment of the modulated second light beams on the primary optical antenna based on said at least a portion of the modulated second light beams, and generate corresponding beam stabilization information;
wherein the beam stabilization information is usable by the first optical router to adjust a transmission angle of the modulated second light beams to minimize the misalignment of the modulated second light beams on the primary optical antenna of the primary transceiver unit.

11. The network of claim 10,
wherein the first optical router comprises a router optical antenna, a router receiver and a router active optics control system;
wherein the primary transceiver unit is configured to modulate beam stabilization information onto the first light beam in addition to the first data, wherein the beam stabilization information indicates misalignment of the modulated second light beams on a primary optical antenna of the primary transceiver unit;
wherein the router optical antenna is configured to receive the modulated first light beam from the atmosphere;
wherein the router receiver is configured to receive a first beam portion of said first light beam, to demodulate the beam stabilization information from the first beam portion, and to provide the beam stabilization information to the router active optics control system;
wherein the router active optics control system is configured to control the router optical antenna to stabilize the modulated second light beams on the primary optical antenna of the primary transceiver unit in response to the beam stabilization information.

12. The network of claim 6,
wherein the first optical router comprises a router optical antenna and a router active optics control system;
wherein the router optical antenna is configured to receive the first light beam, transmitted by the primary transceiver unit, from the atmosphere;
wherein the router active optics control system is configured to receive a first portion of the first light beam, detect misalignment of the first light beam on the router optical antenna based on said first portion, and generate corresponding first beam stabilization information;
wherein the first beam stabilization information is usable by the primary transceiver unit to adjust a transmission direction of the first light beam to minimize the misalignment of the first light beam on the router optical antenna.

13. The network of claim 6,
wherein the primary transceiver unit comprises a primary optical antenna, a primary receiver and a primary active optics control system;
wherein the first optical router is configured to transmit a control light beam carrying beam stabilization information through the atmosphere to the primary transceiver unit, wherein the beam stabilization information indicates misalignment of the modulated first light beam on a router optical antenna of the first optical router;
wherein the primary optical antenna is configured to receive the control light beam from the atmosphere, and transmit the modulated first light beam into the atmosphere;
wherein the primary receiver is configured to receive at least a portion of the control light beam, demodulate the beam stabilization information from said at least a portion of the control light beam, and provide the beam stabilization information to the primary active optics control system;
wherein the primary active optics control system is configured to adjust an angular orientation of the primary optical antenna to minimize the misalignment of the modulated first light beam on the router optical antenna.

14. The network of claim 6,
wherein a first of the one or more subscriber transceiver units comprises a subscriber optical antenna and a subscriber beam alignment detector;
wherein the subscriber optical antenna is configured to receive said one or more portions of said first light beam from the atmosphere;
wherein the subscriber beam alignment detector is configured to receive at least a fraction of said one or more portions of the first light beam, detect misalignment of the first light beam on the subscriber optical antenna from said at least a fraction, and generate corresponding beam alignment information;
wherein the beam alignment information is usable by the first optical router to adjust an angle of redirection of the first light beam into the atmosphere so as to stabilize the first light beam on the subscriber optical antenna.

15. The network of claim 6,
wherein the first optical router comprises a router receiver and a router active optics control system;
wherein the primary transceiver unit is configured to modulate beam stabilization information onto the first light beam in addition to the first data;
wherein the router receiver is configured to receive at least a portion of the first light beam, demodulate the beam stabilization information from said at least a portion of the first light beam, and provide the beam stabilization information to the router active optics control system;
wherein, in response to the beam stabilization information, the router active optics control system is configured to adjust an angle of redirection of at least a first portion of said modulated first light beam into the atmosphere to minimize the misalignment of said first portion of the modulated first light beam on a first of said plurality of subscriber transceiver units.

16. The network of claim 6,
wherein the first optical router comprises a router active optics control system;
wherein the plurality of modulated second light beams, received from the atmosphere by the first optical router, includes a particular light beam transmitted into the atmosphere by a first of said one or more subscriber transceiver units;
wherein the router active optics control system is configured to receive a portion of the particular light beam, detect misalignment of the particular light beam on the first optical router from said portion of the particular light beam, and generate corresponding beam stabilization information;
wherein the beam stabilization information is usable by the first subscriber transceiver unit to adjust a transmission direction of the particular light beam to optimally direct the particular light beam to said first optical router.

17. The network of claim 16,
wherein the first optical router further comprises a light source, a beam modulator and a router optical antenna;
wherein the router active optics control system is further configured to provide the beam stabilization information to the beam modulator;
wherein the light source is configured to generate a control light beam;
wherein the beam modulator is configured to modulate the beam stabilization information onto the control light beam;
wherein the router optical antenna is configured to direct the modulated control light beam into the atmosphere to the primary transceiver unit.

18. The network of claim 16,
wherein the primary transceiver unit is configured to receive a modulated control light beam carrying said beam stabilization information from the atmosphere, demodulate the beam stabilization information from the modulated control light beam, and modulate the beam stabilization information onto the first light beam in addition to the first data;
wherein the optical router is configured to receive the first light beam from the atmosphere, and redirect a first portion of the first light beam containing the beam stabilization information to the first subscriber transceiver unit through the atmosphere;
wherein the first subscriber transceiver unit is configured to demodulate the beam stabilization information from the first portion of the first light beam, and adjust the transmission direction of the particular light beam to optimally direct the particular light beam to said first optical router.

19. The network of claim 6, wherein a first of said plurality of subscriber transceiver units includes a subscriber light source configured to generate said corresponding second light beam.

20. The network of claim 6, wherein a second of said plurality of subscriber transceiver units comprises means for generating the corresponding second light beam from the one or more received portions of the modulated first light beam.

21. The network of claim 6, wherein a third of said plurality of subscriber transceiver units includes a subscriber optical antenna coupled to an input/output device by a transmission medium,
wherein at least a portion of said first data and said second data packet are communicated between said subscriber optical antenna and said input/output device along said transmission medium.

22. The network of claim 21, wherein said transmission medium is a fiber optic cable;
wherein said subscriber optical antenna is configured to receive said one or more portions of the modulated first light beam from the atmosphere, and couple said one or more portions of the modulated first light beam onto said fiber optic cable;
wherein said input/output device is configured to decouple said one or more portions of the modulated first light beam from said fiber optic cable, demodulate at least a first packet of said first data from said one or more portions of the modulated first light beam;
wherein said input/output device further comprises a subscriber light source which generates said corresponding second light beam, wherein said input/output device is configured to modulate said corresponding second data packet on said second light beam, and couple the modulated second light beam onto the fiber optic cable;
wherein said subscriber optical antenna is configured to decouple said modulated second light beam from said fiber optic cable, and atmospherically transmit said modulated second light beam.

23. The network of claim 21, wherein said transmission medium is a fiber optic cable;
wherein said subscriber optical antenna is configured to receive said one or more portions of the modulated first light beam from the atmosphere, and couple said one or more portions of the modulated first light beam onto said fiber optic cable;

wherein said input/output device is configured to decouple said one or more portions of the modulated first light beam from said fiber optic cable, demodulate at least a first packet of said first data from said one or more portions of the first light beam, remove the first data from the one or more portions of the modulated first light beam to generate the corresponding second light beam, modulate said corresponding second data packet on said second light beam, and couple the modulated second light beam onto the fiber optic cable;

wherein said subscriber optical antenna is configured to decouple said modulated second light beam from said fiber optic cable, and atmospherically transmit said modulated second light beam to said first optical router.

24. The network of claim 6, wherein said primary transceiver unit is configured to modulate timing control information onto said first light beam in addition to the first data to generate the modulated first light beam;

wherein a first of said plurality of subscriber transceiver units is configured to demodulate the timing control information from said one or more portions of the modulated first light beam;

wherein said first subscriber transceiver unit is configured to determine transmission times for said modulated second light beam in response to the timing control information.

25. The network of claim 6, wherein a first of said plurality of subscriber transceiver units comprises a rotatably mounted optical antenna, and a means for controlling the direction of the rotatably mounted optical antenna.

26. The network of claim 25, wherein the direction controlling means is configured to control the rotatably mounted optical antenna to detect and focus on the first optical router.

27. The network of claim 26, wherein the direction controlling means is configured to control the rotatably mounted optical antenna to detect and focus on a second optical router.

28. The network of claim 27, wherein the direction controlling means is configured to control the rotatably mounted optical antenna to detect and focus on a second optical router in response to a loss of light beam reception from the first optical router.

29. The network of claim 6, wherein a first of the plurality of subscriber transceiver units comprises an omnidirectional antenna for receiving and transmitting light beams from the atmosphere and into the atmosphere respectively.

30. The network of claim 29, wherein the omnidirectional antenna comprises a mirror.

31. The network of claim 1, wherein said portions of the first light beam comprise time-slices of the first light beam.

32. The network of claim 31, wherein the first optical router is configured to redirect a first of said portions of said first light beam to a first of said plurality of subscriber transceiver units during a first time period, and redirect a second of said portions of said first light beam to a second of said plurality of subscriber transceiver units during a second time period.

33. The network of claim 32, wherein the first subscriber transceiver unit is configured to transmit a second light beam comprising second data into the atmosphere;

wherein, during the first time period, the first optical router is configured to receive the second light beam from the atmosphere and to redirect the second light beam into the atmosphere so that the redirected second light beam targets the primary transceiver unit.

34. The network of claim 33, wherein the first subscriber transceiver unit is configured to initiate and terminate transmission of the second light beam into the atmosphere so that the second light beam arrives at the first optical router during the first time period.

35. The network of claim 1, wherein the first optical router comprises one or more directionally controllable X-Y beam deflectors configured to deflect the first light beam in a plurality of directions into the atmosphere, wherein the plurality of directions target the plurality of the subscriber transceiver units.

36. The network of claim 1, wherein said portions of the first light beam comprise wavelength components of the first light beam.

37. The network of claim 36, wherein the first optical router comprises a means for spatially separating the wavelength components, and one or more X/Y beam deflectors configured to deflect said wavelength components of the first light beam to the plurality of subscriber transceiver units.

38. The network of claim 36, wherein a first of said subscriber transceiver units is configured to transmit a first wavelength beam having a first wavelength, carrying second data, into the atmosphere in a first direction targeting the first optical router;

wherein a second of said subscriber transceiver units is configured to transmit a second wavelength beam having a second wavelength different from the first wavelength, carrying third data, into the atmosphere in a second direction targeting the first optical router;

wherein the first optical router is configured to receive the first wavelength beam and the second wavelength beam, and to redirect the first wavelength beam and the second wavelength beam along a common optical path through the atmosphere to the primary transceiver unit.

39. The network of claim 38, wherein the primary transceiver unit is configured to receive a composite light beam comprising the first wavelength beam and the second wavelength beam, separate the first wavelength beam and the second wavelength beam from the composite light beam, demodulate the second data from the first wavelength beam and the third data from the second wavelength beam.

40. The network of claim 1 further comprising a plurality of optical routers including said first optical router;

wherein the primary transceiver unit is configured to transmit to each of the optical routers a corresponding first light beam carrying corresponding first data through the atmosphere;

wherein each of said plurality of optical routers is configured to receive the corresponding first light beam from the atmosphere, to redirect portions of the corresponding first light beam to a corresponding set of subscriber transceiver units within a range of accessibility of the optical router.

41. The network of claim 40, wherein each of said optical routers is configured to receive from the atmosphere a corresponding collection of second light beams carrying second data from the corresponding set of subscriber transceiver units;

wherein each of said optical routers is configured to redirect the corresponding collection of second light beams into the atmosphere in the direction of the primary transceiver unit;

wherein the primary transceiver unit is configured to receive the collection of second light beams, transmitted by each of the optical routers, from the atmosphere, and recover the second data from each set of subscriber transceiver units from the corresponding collection of second light beams.

42. The network of claim 40, wherein a first accessibility region of a first of said optical routers overlaps with a second accessibility region of a second of said optical routers;

wherein a first subscriber transceiver unit is situated within an intersection of the first accessibility region and the second accessibility region.

43. The network of claim 40, wherein a first set of subscriber transceiver units within a first accessibility range of a first of said optical routers, and a second set of subscriber transceiver units within a second accessibility range of a second of said optical routers, share a common subset of subscriber transceiver units.

44. The network of claim 1, wherein the first optical router comprises a router optical antenna, a mirror, and a first X-Y beam deflector;

wherein the router optical antenna is configured to receive the first light beam comprising first data from the atmosphere;

wherein the first X-Y beam deflector is optically positioned between said router optical antenna and said mirror, wherein said first X-Y beam deflector is configured to receive the first light beam from the router optical antenna and to deflect the first light beam onto one or more positions on a surface of the mirror;

wherein the mirror is configured to reflect the first light beam in one or more directions into the atmosphere corresponding to said one or more positions on the mirror surface, wherein the one or more directions target one or more of said plurality of subscriber transceiver units.

45. The network of claim 44, wherein each of the one or more subscriber transceiver units is configured to transmit a second light beam comprising corresponding second data to the first optical router through the atmosphere;

wherein the mirror is configured to receive the one or more second light beams from the atmosphere, and to reflect the one or more second light beams to the first X-Y beam deflector;

wherein the first X-Y beam deflector is configured to deflect one or more second light beams to the router optical antenna; and wherein the router optical antenna is configured to direct the one or more second light beams through the atmosphere to the primary transceiver unit.

46. The network of claim 45, wherein the first optical router further comprises a router active optics control system;

wherein the one or more second light beams, received at said mirror from the atmosphere, include a particular light beam transmitted into the atmosphere by a first of said one or more subscriber transceiver units;

wherein the router active optics control system is configured to receive a portion of the particular light beam, detect misalignment of the particular light beam on the mirror based on said portion of the particular light beam, and generate corresponding beam stabilization information;

wherein the beam stabilization information is usable by the first subscriber transceiver unit to adjust a transmission direction of the particular light beam to optimally direct the particular light beam to said mirror of the first optical router.

47. The network of claim 44, wherein the first optical router further comprises a receiver and a beam deflector control system;

wherein the first X-Y beam deflector is configured to deflect the first light beam onto a control position on the mirror surface during a control time period, wherein the control position is selected so that the mirror reflects the first light beam onto a optical path which targets the receiver, wherein the first light beam carries control information during the control time period;

wherein the receiver is configured to receive the first light beam, to demodulate the control information from the first light beam, and to provide the control information to the beam deflector control system; and wherein the beam deflector control system controls the orientation of the first X-Y beam deflector in response to the control information.

48. The network of claim 47, wherein the control information comprises beam stabilization information, wherein the beam stabilization information indicates misalignment of said first light beam at a subscriber optical antenna of a first of said one or more subscriber transceiver units;

wherein the beam deflector control system is further configured to control the first X/Y beam deflector to minimize the misalignment the first light beam at the subscriber optical antenna of the first subscriber transceiver unit in response to the control information.

49. The network of claim 47, wherein first beam deflector control system controls switching times of the first X-Y beam deflector in response to the routing control information.

50. A point-to-multipoint wide area communications network employing atmospheric optical communication, comprising:

a plurality of subscriber transceiver units;

a first optical router; and a primary transceiver unit comprising a primary light source configured to generate a first light beam, wherein said primary transceiver unit is configured to modulate subscriber data packets on said first light beam, and to transmit said modulated first light beam into the atmosphere;

wherein said first optical router is configured to receive said modulated first light beam from the atmosphere, demodulate the subscriber data packets from the modulated first light beam, modulate a first subset of the subscriber data packets on a second light beam, and transmit portions of said modulated second light beam through the atmosphere to a first subset of said plurality of subscriber transceiver units;

wherein each subscriber transceiver unit of said first subset of subscriber transceiver units is configured to receive one or more of said portions of said modulated second light beam from the atmosphere, and to demodulate one or more subscriber data packets of said first subset of subscriber data packets from said one or more portions of said modulated second light beam;

wherein said primary transceiver unit, said first optical router and said plurality of subscriber transceiver units comprise a wide area optical telecommunications network.

51. The network of claim 50, wherein the first subset of said plurality of subscriber transceiver units equals one or more or all of said plurality of subscriber transceiver units.

52. The network of claim 50, wherein the first optical router is further configured to modulate a second subset of the subscriber data packets on a third light beam, transmit portions of the modulated third light beam to a second subset of said plurality of subscriber transceiver units;

wherein each subscriber transceiver unit of the second subset of subscriber transceiver units is configured to receive one or more portions of said modulated third light beam from the atmosphere, and to demodulate one or more subscriber data packets of said second subset of subscriber data packets from said one or more portions of said modulated third light beam.

53. The network of claim 52, wherein the first subset of subscriber data packets equals the second subset of subscriber data packets.

54. The network of claim 50, wherein a first subscriber transceiver unit of said first subset of subscriber transceiver units is configured to provide said one or more subscriber data packets to one or more communication devices.

55. The network of claim 54, wherein a first of said one or more communication devices is a computer, a television, a telephone, or a video conferencing system.

56. The network of claim 50, wherein the primary transceiver unit is configured to receive said subscriber data packets from one or more data sources.

57. The network of claim 56, wherein a first of said one or more data sources is a telephone network, a cable television system, the Internet, a network employing Asynchronous Transfer Mode (ATM), a network employing switched-Ethernet, a network employing SONNET, a network employing FDDI, a network employing Fibre-Channel, or a network employing Serial Digital Hierarchy.

58. The network of claim 50, wherein each subscriber transceiver unit of said first plurality of subscriber transceiver units is further configured to modulate corresponding second data on a corresponding third light beam, and to transmit said modulated third light beam to said first optical router through the atmosphere;

wherein said first optical router is further configured to receive a plurality of said modulated third light beams, having been transmitted through the atmosphere by said plurality of subscriber transceiver units, from the atmosphere, to demodulate the corresponding second data from each of said modulated third light beams, to modulate the corresponding second data from each of said modulated third light beams on a fourth light beam, and to transmit said modulated fourth light beam to said primary transceiver unit through the atmosphere; and wherein said primary transceiver unit is configured to receive said modulated fourth light beam from the atmosphere, and to demodulate said second data corresponding to each of the plurality of subscriber transceiver units from said modulated fourth light beam.

59. The network of claim 58, wherein the primary transceiver unit comprises a primary optical antenna and a primary beam alignment detector;

wherein the primary optical antenna is configured to receive the modulated fourth light beam from the atmosphere;

wherein the primary beam alignment detector is configured to receive at least a portion of the modulated fourth light beam, detect misalignment of the modulated fourth light beam on the primary optical antenna based on said at least a portion of the modulated fourth light beam, and generate corresponding beam stabilization information;

wherein the beam stabilization information is usable by the first optical router to adjust a transmission angle of the modulated fourth light beam to minimize the misalignment of the modulated fourth light beam on the primary optical antenna of the primary transceiver unit.

60. The network of claim 58, wherein the first optical router comprises a router optical antenna, a router receiver and a router active optics control system;

wherein the primary transceiver unit comprises a primary optical antenna configured to receive the modulated fourth light beam from the atmosphere;

wherein the primary transceiver unit is configured to modulate beam stabilization information onto the first light beam in addition to the subscriber data packets, wherein the beam stabilization information indicates misalignment of the modulated fourth light beam on said primary optical antenna of the primary transceiver unit;

wherein the router optical antenna is configured to receive the modulated first light beam from the atmosphere;

wherein the router receiver is configured to receive a first beam portion of said modulated first light beam, to demodulate the beam stabilization information from the first beam portion, and to provide the beam stabilization information to the router active optics control system;

wherein the router active optics control system is configured to control the router optical antenna to stabilize the modulated fourth light beam on the primary optical antenna of the primary transceiver unit in response to the beam stabilization information.

61. The network of claim 58, wherein the first optical router comprises a beam alignment detector;

wherein said plurality of modulated third light beams comprises a particular light beam transmitted into the atmosphere by a first subscriber transceiver unit of said first subset of subscriber transceiver units;

wherein the beam alignment detector is configured to receive a portion of the particular light beam, detect misalignment of the particular light beam on a receiving element of the first optical router based on said portion of the particular light beam, and generate corresponding beam stabilization information;

wherein the beam stabilization information is usable by the first subscriber transceiver unit to adjust a transmission direction of the particular light beam into the atmosphere to optimally direct the particular light beam to said first optical router.

62. The network of claim 61, wherein the first optical router is further configured to modulate the beam stabilization information on the fourth light beam in addition to the second data from each of the subscriber transceiver units of the first subset of subscriber transceiver units;

wherein the primary transceiver unit is configured to demodulate the beam stabilization information from the modulated forth light beam, and modulate the beam stabilization information on the first light beam;

wherein the first optical router is further configured to demodulate the beam stabilization information from the modulated first light beam, and modulate the beam stabilization information on the second light beam;

wherein the first subscriber transceiver unit is configured to demodulate the beam stabilization information from said one or more portions of the modulated second light beam, and to control a transmission direction of the particular light beam into the atmosphere so as to minimize the misalignment of the particular light beam on the receiving element of the first optical router.

63. The network of claim 61, wherein the first subscriber transceiver unit comprises a subscriber optical antenna and a subscriber active optics control system;

wherein the subscriber optical antenna is configured to transmit the particular light beam into the atmosphere;

wherein the subscriber active optics control system is configured to receive the beam stabilization information, and control the angular orientation of the subscriber optical antenna so as to minimize the misalignment of the particular light beam on the receiving element of the first optical router.

64. The network of claim 58, wherein the modulated first light beam and the modulated fourth light beam follow paths through the atmosphere between the primary transceiver unit and the first optical router which are substantially collinear.

65. The network of claim 58, wherein the modulated first light beam and modulated fourth light beam are orthogonally polarized.

66. The network of claim 58, wherein a first subscriber transceiver unit of said first subset of subscriber transceiver units includes a subscriber light source configured to generate the corresponding third light beam.

67. The network of claim 58, wherein a second subscriber transceiver unit of said first subset of subscriber transceiver units comprises means for generating the corresponding third light beam from the one or more received portions of the modulated second light beam.

68. The network of claim 58, wherein a third subscriber transceiver unit of said first subset of subscriber transceiver units includes a subscriber optical antenna coupled to an input/output device by a transmission medium.

69. The network of claim 68, wherein said transmission medium is a fiber optic cable;

wherein said subscriber optical antenna is configured to receive said one or more portions of the modulated second light beam from the atmosphere, and couple said one or more portions of the modulated second light beam onto said fiber optic cable;

wherein said input/output device is configured to decouple said one or more portions of the modulated second light beam from said fiber optic cable, demodulate said one or more subscriber data packets from said one or more portions of the modulated second light beam;

wherein said input/output device further comprises a subscriber light source which generates said corresponding third light beam, wherein said input/output device is configured to modulate said corresponding second data on said third light beam, and couple the modulated third light beam onto the fiber optic cable;

wherein said subscriber optical antenna is configured to decouple said modulated third light beam from said fiber optic cable, and atmospherically transmit said modulated third light beam.

70. The network of claim 68, wherein said transmission medium is a fiber optic cable;

wherein said subscriber optical antenna is configured to receive said one or more portions of the modulated second light beam from the atmosphere, and couple said one or more portions of the modulated second light beam onto said fiber optic cable;

wherein said input/output device is configured to decouple said one or more portions of the modulated second light beam from said fiber optic cable, demodulate said one or more subscriber data packets from said one or more portions of the modulated second light beam, remove all data modulation from the one or more portions of the modulated second light beam to generate the corresponding third light beam, modulate said corresponding second data on said third light beam, and couple the modulated third light beam onto the fiber optic cable;

wherein said subscriber optical antenna is configured to decouple said modulated third light beam from said fiber optic cable, and atmospherically transmit said modulated third light beam to said first optical router.

71. The network of claim 58, wherein said primary transceiver unit is configured to modulate timing control information onto said first light beam in addition to the first data to generate the modulated first light beam;

wherein the first optical router is further configured to demodulate the timing control information from the modulated first light beam, and modulate the timing control information on the second light beam;

wherein a first subscriber transceiver unit of said first subset of subscriber transceiver units is configured to demodulate a first part of the timing control information from said one or more portions of the modulated second light beam;

wherein said first subscriber transceiver unit is configured to determine transmission times for said modulated third light beam in response to said first part of the timing control information.

72. The network of claim 58, wherein a first subscriber transceiver unit of said plurality of subscriber transceiver units comprises a rotatably mounted optical antenna, and a means for controlling the direction of the rotatably mounted optical antenna.

73. The network of claim 72, wherein the direction controlling means is configured to control the rotatably mounted optical antenna to detect and focus on the first optical router.

74. The network of claim 73, wherein the direction controlling means is configured to control the rotatably mounted optical antenna to detect and focus on a second optical router.

75. The network of claim 74, wherein the direction controlling means is configured to control the rotatably mounted optical antenna to detect and focus on a second optical router in response to a loss of light beam reception from the first optical router.

76. The network of claim 58, wherein a first of the plurality of subscriber transceiver units comprises an omnidirectional antenna for receiving and transmitting light beams from the atmosphere and into the atmosphere respectively.

77. The network of claim 76, wherein the omni-directional antenna comprises a mirror.

78. The network of claim 50,
wherein said portions of the modulated second light beam comprise time-slices of the modulated second light beam;
wherein the first optical router is configured to transmit a first portion of said modulated second light beam to a first subscriber transceiver unit of said first subset of subscriber transceiver units during a first time period, and transmit a second portion of said modulated second light beam to a second subscriber transceiver unit of said first subset of subscriber transceiver units during a second time period.

79. The network of claim 78,
wherein the first subscriber transceiver unit is configured to transmit a third light beam comprising second data to the first optical router through the atmosphere;
wherein, during the first time period, the first optical router is configured to receive the third light beam from the atmosphere; and
wherein the first optical router is further configured to transmit a fourth light beam containing the second data to the primary transceiver unit through the atmosphere.

80. The network of claim 79, wherein the first subscriber transceiver unit is configured to initiate and terminate transmission of the third light beam into the atmosphere so that the third light beam arrives at the first optical router during the first time period.

81. The network of claim 50, wherein the first optical router comprises one or more directionally controllable X-Y beam deflectors and one or more router light sources;
wherein the one or more router light sources are configured to generate one or more router light beams respectively, wherein the one or more router light beams include the second light beam;
wherein each of said one or more directionally controllable X-Y beam deflectors is configured to deflect a corresponding one of said one or more router light beams in a controllable direction into the atmosphere.

82. The network of claim 50 further comprising a plurality of optical routers including said first optical router;
wherein the primary transceiver unit is configured to generate a plurality of primary light beams including the first light beam, and, for each of the primary light beams, to modulate thereon a corresponding set of subscriber data packets;
wherein the primary transceiver unit is further configured to transmit to each of the optical routers a corresponding one of the modulated primary light beams through the atmosphere;
wherein each of said plurality of optical routers is configured to receive the corresponding one of the modulated primary light beams from the atmosphere, demodulate the corresponding set of subscriber data packets from the corresponding one of the modulated primary light beams, modulate the corresponding set of subscriber data packets on a corresponding set of one or more secondary light beams, and transmit the corresponding set of one or more secondary light beams to a corresponding set of subscriber transceiver units within a corresponding range of accessibility of the optical router.

83. The network of claim 82,
wherein each of said optical routers is configured to receive from the atmosphere a corresponding collection of third light beams containing second data from the corresponding set of subscriber transceiver units;
wherein each of said optical routers is configured to receive the corresponding collection of third light beams, and transmit a fourth light beam containing the second data to the primary transceiver unit through the atmosphere;
wherein the primary transceiver unit is configured to receive a plurality of said fourth light beams from the atmosphere, and recover the second data corresponding to each set of subscriber transceiver units from the corresponding fourth light beam.

84. The network of claim 82,
wherein a first accessibility region of a first of said optical routers overlaps with a second accessibility region of a second of said optical routers;
wherein a first subscriber transceiver unit is situated within an intersection of the first accessibility region and the second accessibility region;
wherein said first subscriber transceiver unit is configured to perform atmospheric light-beam-based data communication with said primary transceiver unit through said first optical router and said second optical router.

85. The network of claim 82,
wherein a first set of subscriber transceiver units within a first accessibility range of a first of said optical routers, and a second set of subscriber transceiver units within a second accessibility range of a second of said optical routers, share a common subset of subscriber transceiver units.

86. The network of claim 50 wherein the first optical router comprises:
a secondary transceiver unit configured to receive the modulated first light beam from the atmosphere, and to demodulate the subscriber data packets from the modulated first light beam;
one or more transceiver modules, wherein each of said one or more transceiver modules comprises a module light source, a module beam modulator and a module X/Y beam deflector;
an electronic router configured to receive the subscriber data packets from the secondary transceiver unit, and to route the subscriber data packets to the one or more transceiver modules;
wherein the module light source of a first transceiver module of said one or more transceiver modules is configured to generate said second light beam;
wherein the module beam modulator of said first transceiver module is configured to receive said first subset of subscriber data packets from said electronic router, and modulate said first subset of subscriber data packets onto the second light beam;
wherein the module X/Y beam deflector of the first transceiver module is configured to receive the modulated second light beam and to deflect the modulated second light beam into the atmosphere in one or more spatial directions corresponding to the first subset of subscriber transceiver units respectively.

87. The network of claim 86, wherein said first subset of subscriber data packets comprises a first data packet and a second data packet;
wherein, during a first time period, (a) the module beam modulator of the first transceiver module modulates at least a portion of the first data packet onto the second light beam, and (b) the module X/Y beam deflector of the first transceiver module deflects the modulated second light beam, carrying said at least the portion of the first data packet, into the atmosphere in a first spatial direction; and wherein, during a second time period, (c) the module beam modulator of the first transceiver module modulates at least a portion of the second data packet onto the second light beam, and (d) the module X/Y beam deflector of the first transceiver module deflects the modulated second light beam, carrying said at the portion of the second data packet, into the atmosphere in a second spatial direction.

88. The network of claim 86, wherein the module light source of a second transceiver module of said one or more transceiver modules is configured to generate a third light beam;

wherein the module beam modulator of said second transceiver module is configured to receive a second subset of said subscriber data packets from the electronic router, and modulate the second subset of subscriber data packets on said third light beam;

wherein the module X/Y beam deflector of the second transceiver module is configured to deflect the modulated third light beam into the atmosphere in directions targeting a second subset of said plurality of subscriber transceiver units.

89. The network of claim 86, wherein the first optical router further comprises a beam deflector control system;

wherein the modulated first light beam includes control information;

wherein the secondary transceiver unit is further configured to demodulate the control information from the first light beam, and provide the control information to the beam deflector control system through the electronic router;

wherein the beam deflector control system is configured to control the deflection orientation of the module X/Y beam deflector in the first transceiver module in response to the control information, wherein said control information determines the one or more spatial directions in which the modulated second light beam is deflected into the atmosphere.

90. The network of claim 89, wherein the beam deflector control system controls switching times of the module X-Y beam deflector of the first transceiver module in response to the control information.

91. The network of claim 89, wherein the control information comprises beam stabilization information, wherein the beam stabilization information indicates misalignment of said modulated second light beam at a subscriber optical antenna of a first subscriber transceiver unit of said first subset of subscriber transceiver units;

wherein the beam deflector control system is further configured to control the module X/Y beam deflector of the first transceiver module to minimize the misalignment the modulated second light beam at the subscriber optical antenna of the first subscriber transceiver unit in response to the control information.

92. The network of claim 86, wherein each of said one or more transceiver modules further comprises a module beam demodulator;

wherein a first subscriber transceiver module of said first subset of subscriber transceiver modules is configured to transmit a third light beam, comprising second data, through the atmosphere to the first optical router;

wherein the module X/Y beam deflector of the first transceiver module is further configured to receive said third light beam, and to deflect the third light beam onto a optical path which at least partially targets the module beam demodulator of the first transceiver module;

wherein the module beam demodulator of the first transceiver module is configured to demodulate the second data from the third light beam, and to provide the second data to the electronic router;

wherein the electronic router is configured to route the second data to the secondary transceiver unit;

wherein the secondary transceiver unit is configured to modulate the second data onto a fourth light beam, and to transmit the modulated fourth light beam to the primary transceiver unit through the atmosphere.

93. The network of claim 92, wherein the secondary transceiver unit comprises a secondary optical antenna, a secondary light source and a secondary beam modulator;

wherein the secondary light source is configured to generate the fourth light beam;

wherein the secondary beam modulator is configured to receive the second data from the electronic router, modulate the second data onto the fourth light beam, and provide the modulated fourth light beam to the secondary optical antenna;

wherein the secondary optical antenna is configured to receive the modulated fourth light beam, and transmit the modulated fourth light beam to the primary transceiver unit through the atmosphere.

94. The network of claim 92, wherein the first transceiver module further comprises a module beam splitter optically positioned between the module X/Y beam deflector and the module beam modulator of the first transceiver module;

wherein the module beam splitter is configured to receive the third light beam from the module X/Y beam deflector, and to redirect a first portion of the third light beam to the module beam demodulator;

wherein the module beam demodulator is configured to demodulate the second data from the first portion of the third light beam.

95. The network of claim 94, wherein the module beam splitter of the first transceiver module is configured to receive the modulated second light beam from the module beam modulator of the first transceiver module, and to substantially pass the modulated second light to the module X/Y beam deflector of the first transceiver module.

96. The network of claim 92, wherein the first transceiver module further comprises a module beam alignment detector;

wherein the module beam alignment detector is configured to receive a second portion of the third light beam, detect misalignment of the third light beam on the module X/Y beam deflector of the first transceiver module based on the second portion of the third light beam, and generate corresponding beam stabilization information;

wherein the beam stabilization information is usable by the first subscriber transceiver to adjust a transmission angle of the third light beam into the atmosphere so as to stabilize the third light beam on the module X/Y beam deflector of the first transceiver module.

97. The network of claim 96,
wherein the module beam alignment detector is further configured to provide the beam stabilization information to the secondary transceiver unit via the electronic router;
wherein the secondary transceiver unit is configured to modulate the beam stabilization information in addition to the second data onto the fourth light beam.

98. The network of claim 86, wherein the secondary transceiver unit further comprises a secondary optical antenna and a secondary transceiver beam demodulator;
wherein the secondary optical antenna is configured to receive the modulated first light beam from the atmosphere and to direct the modulated first light beam onto an optical path which targets the secondary transceiver beam demodulator;
wherein the secondary transceiver beam demodulator is configured to receive at least a portion of said modulated first light beam, demodulate the subscriber data packets from said at least a portion of the modulated first light beam, and provide the subscriber data packets to the electronic router.

99. The network of claim 50,
wherein the first optical router comprises a router optical antenna and a router beam alignment detector;
wherein the router optical antenna is configured to receive the modulated first light beam from the atmosphere;
wherein the router beam alignment detector is configured to receive a first portion of the modulated first light beam, detect misalignment of the modulated first light beam on the router optical antenna based on the first portion of the modulated first light beam, and generate corresponding beam stabilization information;
wherein the beam stabilization information is usable by the primary transceiver unit to adjust a transmission angle of the modulated first light beam so as to minimize the misalignment of the modulated first light beam on the router optical antenna.

100. The network of claim 99,
wherein the first optical router further comprises a router light source and a router beam modulator, wherein the router light source is configured to generate a fourth light beam;
wherein the router beam modulator is configured to receive the beam stabilization information generated by the router beam alignment detector, and modulate the beam stabilization information onto the fourth light beam;
wherein the optical antenna is configured to receive the modulated fourth light beam, and transmit the modulated fourth light beam through the atmosphere to the primary transceiver unit.

101. The network of claim 50,
wherein the primary transceiver unit comprises a primary optical antenna, a primary receiver and a primary active optics control system;
wherein the first optical router is configured to transmit a modulated fourth light beam carrying beam stabilization information through the atmosphere to the primary transceiver unit, wherein the beam stabilization information indicates misalignment of the modulated first light beam on a router optical antenna of the first optical router;
wherein the primary optical antenna is configured to transmit the modulated first light beam into the atmosphere, and to receive the modulated fourth light beam from the atmosphere;
wherein the primary receiver is configured to receive a portion of the modulated fourth light beam, demodulate the beam stabilization information from said portion of the modulated fourth light beam, and provide the beam stabilization information to the primary active optics control system;
wherein the primary active optics control system is configured to adjust an angular orientation of the primary optical antenna to minimize the misalignment of the modulated first light beam on the router optical antenna of the first optical router.

102. The network of claim 50,
wherein a first subscriber transceiver unit of said first subset of subscriber transceiver units comprises a subscriber optical antenna and a subscriber beam alignment detector;
wherein the subscriber optical antenna is configured to receive a first portion of said modulated second light beam from the atmosphere;
wherein the subscriber beam alignment detector is configured to receive at least a fraction of said first portion of the modulated second light beam, detect misalignment of said first portion of the modulated second light beam on the subscriber optical antenna from said at least the fraction, and generate corresponding beam alignment information;
wherein the beam alignment information is usable by the first optical router to adjust an angle of transmission of said first portion of the modulated second light beam into the atmosphere so as to stabilize said first portion of the modulated second light beam on the subscriber optical antenna.

103. The network of claim 102,
wherein the first subscriber transceiver unit is configured to modulate the beam stabilization information on a third light beam, and to transmit the modulated third light beam through the atmosphere to the first optical router;
wherein the first optical router is configured to receive the modulated third light beam, and transmit a fourth light beam containing the beam stabilization information to through the atmosphere to the primary transceiver unit;
wherein the primary transceiver unit is configured to receive the fourth light beam from the atmosphere, recover the beam stabilization information from the fourth light beam, modulate the beam stabilization information onto the first light beam in addition to the subscriber data packets.

104. The network of claim 102,
wherein the first optical router comprises a router receiver and a router beam control system;
wherein the primary transceiver unit is configured to modulate said beam stabilization information onto the first light beam in addition to the subscriber data packets;
wherein the router receiver is configured to receive at least a portion of the modulated first light beam, demodulate the beam stabilization information from said at least said portion of the modulated first light beam, and provide the beam stabilization information to the router beam control system;
wherein, in response to the beam stabilization information, the router beam control system is configured to adjust an angle of transmission of said first portion of said modulated second light beam into the atmosphere so as to stabilize said first portion of the modulated second light beam on the subscriber optical antenna of the first subscriber transceiver unit.

105. A point-to-multipoint wide area communications network employing atmospheric optical communication, comprising:

a plurality of subscriber transceiver units;

a first optical router; and a primary transceiver unit configured to modulate first data on a first light beam, and to transmit said first light beam including said first data into the atmosphere;

wherein said first optical router is configured to receive said first light beam from the atmosphere, and to transmit a second light beam including the first data through the atmosphere to said plurality of subscriber transceiver units;

wherein each of said plurality of subscriber transceiver units is configured to receive one or more of said portions of said second light beam from the atmosphere, and to demodulate at least a portion of said first data from said one or more portions of said second light beam;

wherein said primary transceiver unit, said first optical router and said plurality of subscriber transceiver units comprise a wide area optical telecommunications network.

106. The network of claim 105, wherein each of said plurality of subscriber transceiver units are configured to transmit into the atmosphere a corresponding third light beam containing corresponding second data;

wherein the first optical router is configured to receive a plurality of said third light beams, having been transmitted by said plurality of subscriber transceiver units, from the atmosphere, and to transmit a fourth light beam, containing the second data corresponding to each of the subscriber transceiver units, into the atmosphere;

wherein the primary transceiver unit is configured to receive the fourth light beam from the atmosphere.

* * * * *